US011845528B2

(12) United States Patent
Lazar et al.

(10) Patent No.: US 11,845,528 B2
(45) Date of Patent: Dec. 19, 2023

(54) PRESSURE BULKHEAD ASSEMBLY AND METHOD AND SYSTEM FOR MAKING THE SAME

(71) Applicant: The Boeing Company, Chicago, IL (US)

(72) Inventors: Constantin C. Lazar, Charleston, SC (US); Christopher A. Greer, Summerville, SC (US)

(73) Assignee: The Boeing Company, Arlington, VA (US)

( * ) Notice: Subject to any disclaimer, the term of this patent is extended or adjusted under 35 U.S.C. 154(b) by 106 days.

(21) Appl. No.: 17/524,948

(22) Filed: Nov. 12, 2021

(65) Prior Publication Data

US 2022/0227471 A1 Jul. 21, 2022

Related U.S. Application Data

(60) Provisional application No. 63/139,406, filed on Jan. 20, 2021.

(51) Int. Cl.
| | | |
|---|---|---|
| B64F 5/10 | (2017.01) | |
| B64C 1/10 | (2006.01) | |
| G05B 19/402 | (2006.01) | |

(52) U.S. Cl.
CPC .................. B64C 1/10 (2013.01); B64F 5/10 (2017.01); G05B 19/402 (2013.01); *G05B 2219/45071* (2013.01)

(58) Field of Classification Search
CPC ............ B64C 1/10; B64F 5/10; G05B 19/402
See application file for complete search history.

(56) References Cited

U.S. PATENT DOCUMENTS

| | | |
|---|---|---|
| 5,893,534 A | 4/1999 | Watanabe |
| 8,756,792 B2 | 6/2014 | Boyl-Davis et al. |
| | (Continued) | |

FOREIGN PATENT DOCUMENTS

| | | |
|---|---|---|
| EP | 2 727 821 | 5/2014 |
| EP | 3 028 940 | 6/2016 |
| | (Continued) | |

OTHER PUBLICATIONS

European Patent Office, Extended European Search Report, App. No. 21210671.0 (dated May 20, 2022).

*Primary Examiner* — Nirvana Deonauth
(74) *Attorney, Agent, or Firm* — Walters & Wasylyna LLC

(57) ABSTRACT

A method of making a pressure bulkhead assembly of an aircraft includes determining an optimized position of splice angles such that splice surfaces of the splice angles will form a circumferential splice surface of the pressure bulkhead assembly with an optimized shape. The method further includes performing a virtual fit between the plurality of splice angles, at the optimized position, and an aft pressure bulkhead. The method also includes determining splice-angle-hole positions of splice-angle holes to be drilled in each one of the splice angles such that the splice-angle holes will correspond to aft-pressure-bulkhead holes, pre-drilled in the aft pressure bulkhead. The method further includes drilling the splice-angle holes in each one of the splice angles at the splice-angle-hole positions. The method also includes joining each one of the splice angles with the aft pressure bulkhead such that the splice surfaces form the circumferential splice surface with the optimized shape.

20 Claims, 17 Drawing Sheets

(56) References Cited

U.S. PATENT DOCUMENTS

| | | | |
|---|---|---|---|
| 9,429,935 | B2 | 8/2016 | Boyl-Davis et al. |
| 9,952,580 | B2 | 4/2018 | Bode et al. |
| 2010/0161094 | A1 | 6/2010 | Crothers |
| 2010/0243806 | A1 | 9/2010 | Vera Villares et al. |
| 2013/0266770 | A1 | 10/2013 | Otto et al. |
| 2014/0365061 | A1 | 12/2014 | Vasquez et al. |
| 2017/0220021 | A1 | 8/2017 | Bode et al. |
| 2018/0208328 | A1 | 7/2018 | Charlton et al. |
| 2019/0039711 | A1* | 2/2019 | Diep .................. B64C 1/12 |

FOREIGN PATENT DOCUMENTS

| | | |
|---|---|---|
| EP | 3 199 298 | 8/2017 |
| JP | 2012 024920 | 2/2012 |
| WO | WO 01/76943 | 10/2001 |
| WO | WO 2009/128992 | 10/2009 |
| WO | WO 2011/062696 | 5/2011 |

\* cited by examiner

PRESSURE BULKHEAD ASSEMBLY AND METHOD AND SYSTEM FOR MAKING THE SAME

PRIORITY

This application claims priority from U.S. Ser. No. 63/139,406 filed on Jan. 20, 2021.

FIELD

The present disclosure relates generally to methods and systems for joining structural components and, more particularly, to methods and systems for indexing structural components associated with a pressure bulkhead assembly of an aircraft.

BACKGROUND

Pressure bulkheads are often used in aircraft to separate a pressurized section of a fuselage from an unpressurized section. In some applications, the pressure bulkhead may be mounted within the fuselage and attached to the outer skin of one or more sections of the fuselage. In some instances, the pressure bulkhead is mounted to the aircraft using a plurality of angled members, referred to as splice angles.

The splice angles and the pressure bulkhead are typically assembled on a drill jig using complex and expensive assembly jig tooling. For example, the pressure bulkhead is initially joined with the splice angles. Subsequently, holes are drilled through the pressure bulkhead and the splice angles while both are temporarily joined to each other. However, the use of drill jigs to drill such primary structural joints may result in oversized holes, can require multiple measurement and alignment steps, and/or require the pressure bulkhead and the splice angles to be repeatedly placed and removed from the jig, with any or all leading to production lags. The use of drill jigs can also lead to the pressure bulkhead having nonconforming joining surfaces and/or design of shims that is larger than desired. Also, the flexibility of carbon fiber materials that make up some of the pressure bulkhead components can make it harder to machine the surface of the pressure bulkhead and holes when the pressure bulkhead is attached to the jig.

Thus, there is a need for an assembly method for pressure bulkheads that reduces installation time, increases the accuracy of the size and locations of the hole, increases the accuracy of the position of the splice angles, reduces labor, is readily automated, and minimizes wastage of parts. Accordingly, those skilled in the art continue with research and development efforts in the field of pressure bulkhead assembly.

SUMMARY

Disclosed are examples of a method of making a pressure bulkhead assembly, a system for making a pressure bulkhead assembly, and a pressure bulkhead assembly for an aircraft. The following is a non-exhaustive list of examples, which may or may not be claimed, of the subject matter according to the present disclosure.

In an example, the disclosed method includes steps of: (1) determining an optimized position of a plurality of splice angles such that a plurality of splice surfaces of the plurality of splice angles will form a circumferential splice surface of the pressure bulkhead assembly with an optimized shape; (2) performing a virtual fit between the plurality of splice angles, at the optimized position, and an aft pressure bulkhead; (3) determining splice-angle-hole positions of splice-angle holes to be drilled in each one of the plurality of splice angles such that the splice-angle holes will correspond to aft-pressure-bulkhead holes, pre-drilled in the aft pressure bulkhead; (4) drilling the splice-angle holes in each one of the plurality of splice angles at the splice-angle-hole positions; and (5) joining each one of the plurality of splice angles with the aft pressure bulkhead such that the plurality of splice surfaces forms the circumferential splice surface with the optimized shape.

In an example, the disclosed system includes a measurement machine configured to take measurements of an aft pressure bulkhead and a plurality of splice angles. The system includes a computer system having memory storing a program and a processor. The processor is configured to execute the program to: (1) determine an optimized position of the plurality of splice angles such that a plurality of splice surfaces of the plurality of splice angles will form a circumferential splice surface with an optimized shape; (2) perform a virtual fit between the plurality of splice angles, at the optimized position, and an aft pressure bulkhead; and (3) with the plurality of splice angles at the optimized position, determine splice-angle-hole positions of splice-angle holes to be drilled in each one of the plurality of splice angles such that the splice-angle holes will correspond to aft-pressure-bulkhead holes, pre-drilled in the aft pressure bulkhead. The system includes a Computer Numerically Controlled machine configured to drill the splice-angle holes in each one of the plurality of splice angles at the splice-angle-hole positions. When the plurality of splice angles is joined with the aft pressure bulkhead at the optimized position, the plurality of splice surfaces forms the circumferential splice surface with the optimized shape.

In an example, the disclosed pressure bulkhead assembly includes an aft pressure bulkhead, including a bulkhead interface surface and aft-pressure-bulkhead holes, pre-drilled through the bulkhead interface surface, and a plurality of splice angles, configured to be coupled to the aft pressure bulkhead. Each one of the plurality of splice angles includes a flange surface, configured to mate with the bulkhead interface surface, splice-angle holes, drilled through the flange surface, and a splice surface, extending from the flange surface. With the splice-angle holes aligned with the aft-pressure-bulkhead holes, a plurality of splice surfaces forms a circumferential splice surface with an optimized shape.

Other examples of the disclosed method, system and structural assembly will become apparent from the following detailed description, the accompanying drawings, and the appended claims.

DETAILED DESCRIPTION

Figure 1:
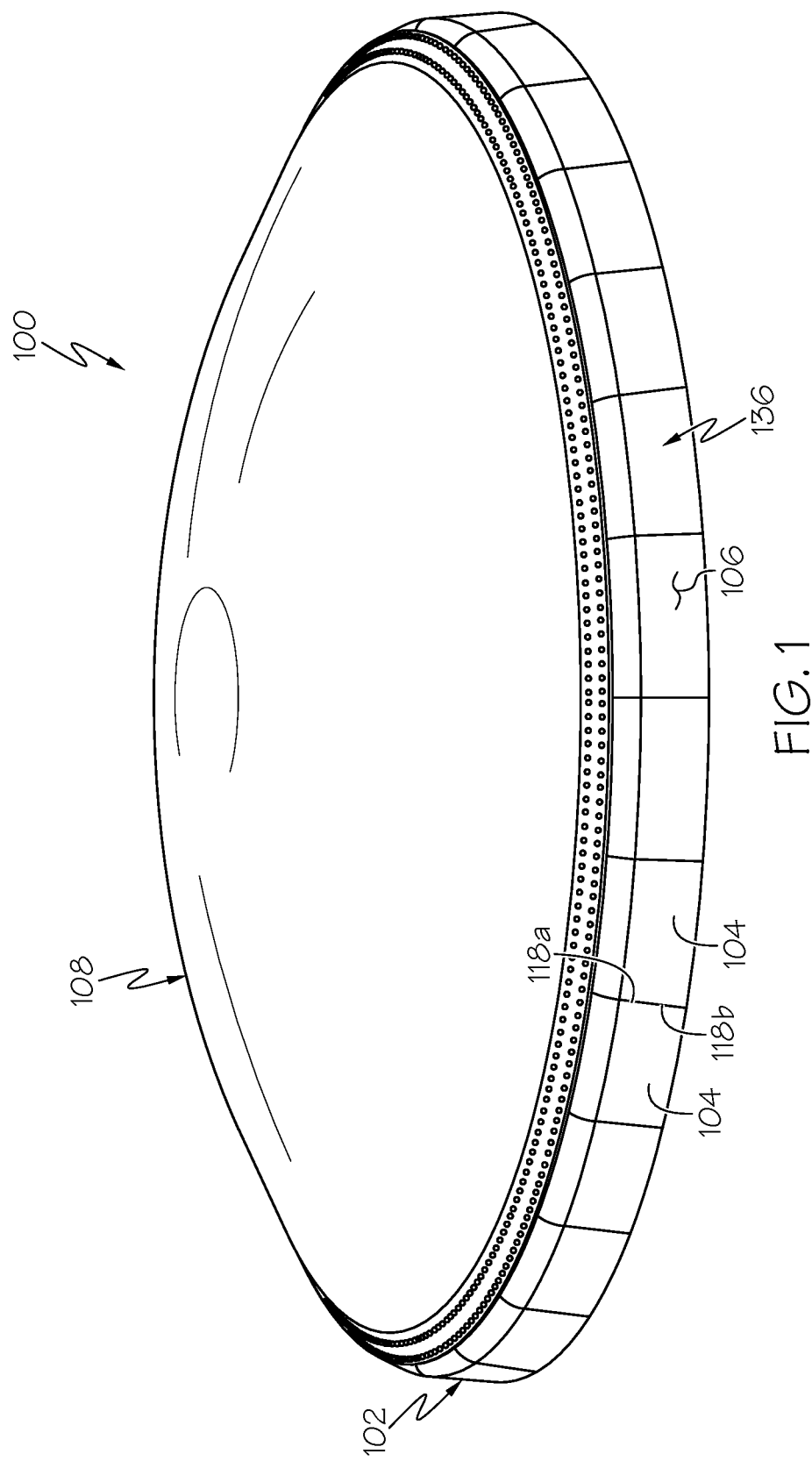
FIG. 1 is a schematic, perspective view of an example of a pressure bulkhead assembly.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Figure 4:
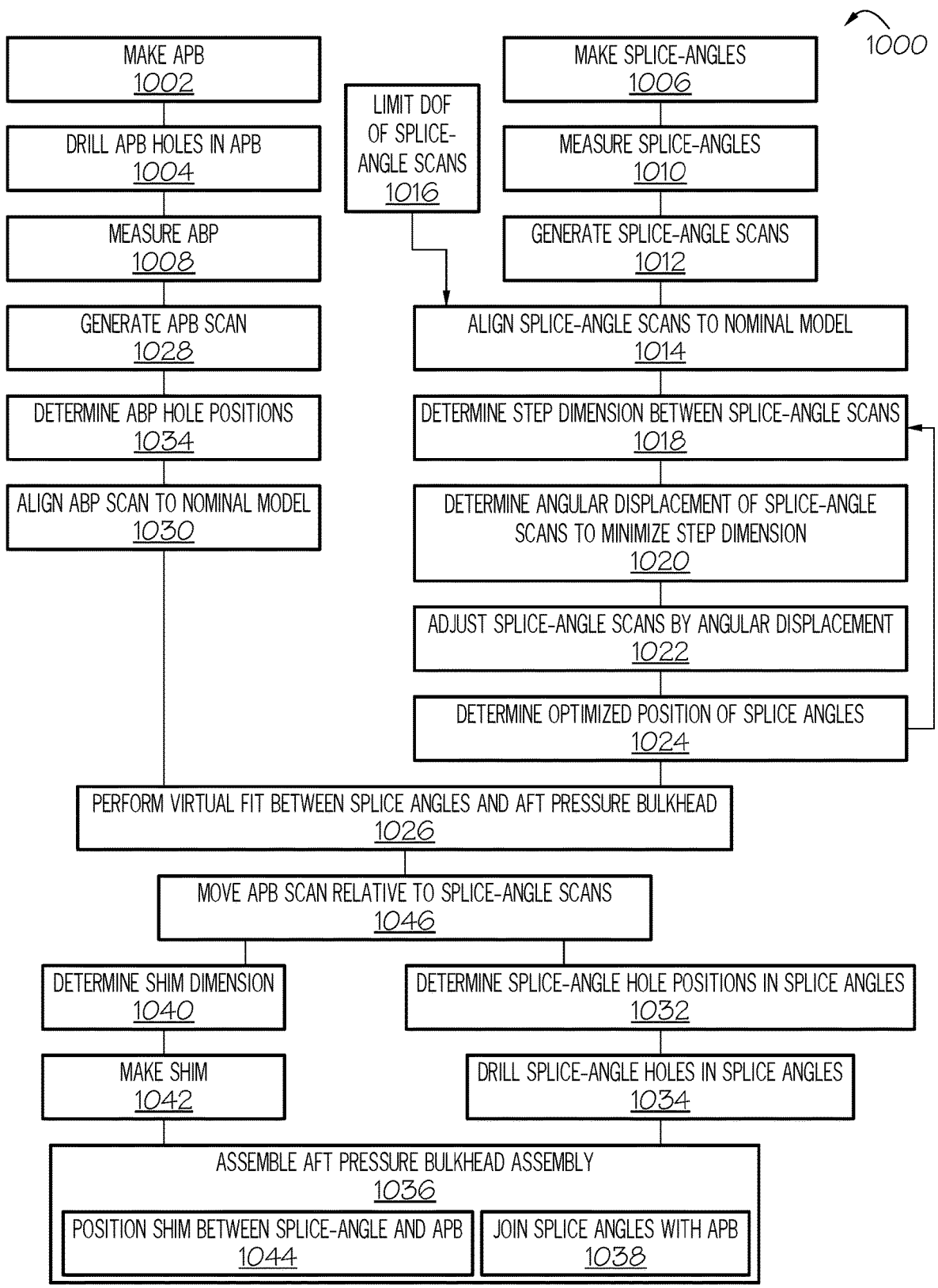
FIG. 4 is a flowchart of an example of a method of making the pressure bulkhead assembly.
Figure 5:
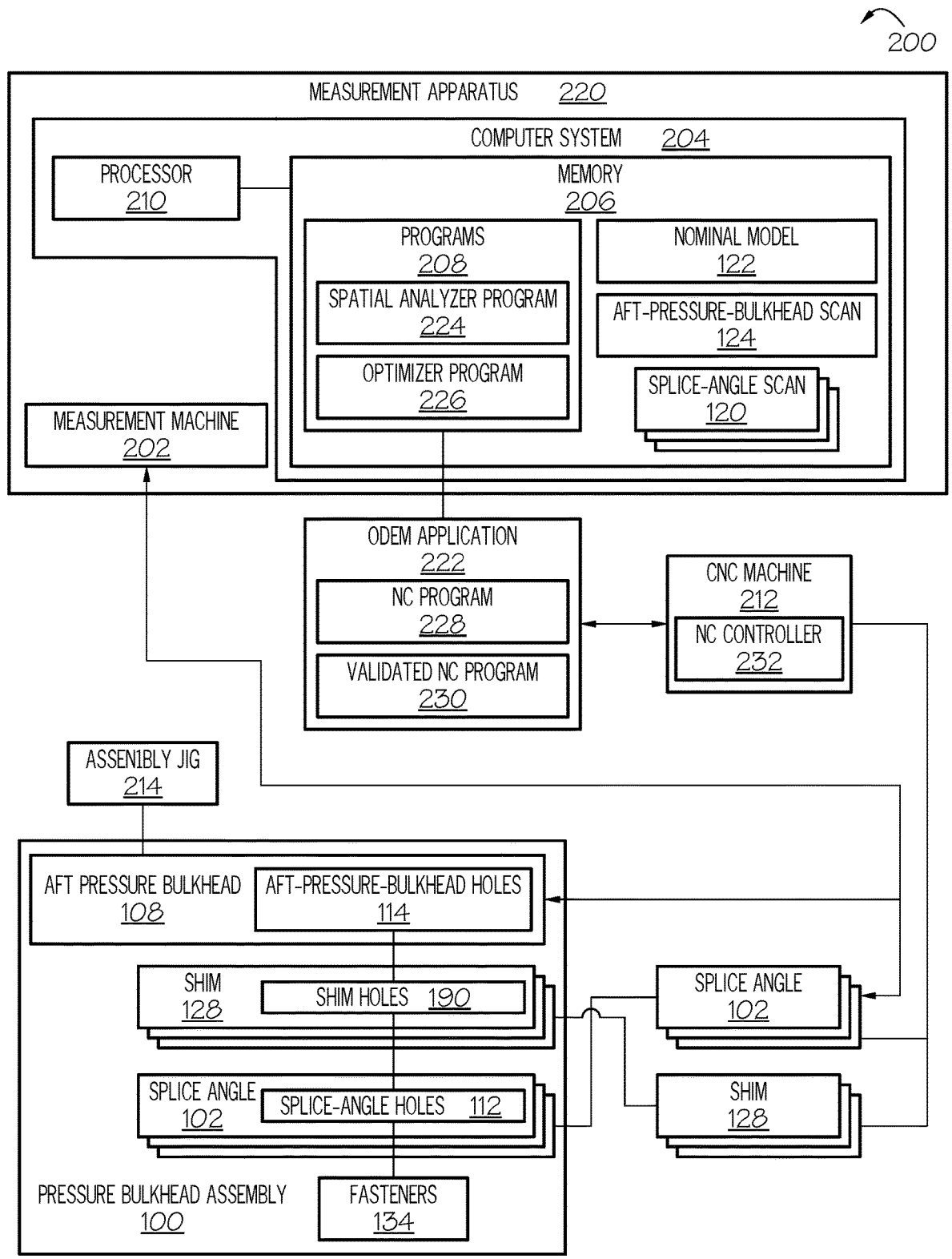
FIG. 5 is a schematic block diagram of an example of a system for making the pressure bulkhead assembly.

Referring to FIG. 1, by way of examples, the present disclosure is directed to a pressure bulkhead assembly 100 that includes an aft pressure bulkhead 108 and a plurality of splice angles 102. Referring generally to FIG. 4, by way of examples, the present disclosure is directed to a method 1000 of making the pressure bulkhead assembly 100 by indexing and installing the plurality of splice angles 102 on the aft pressure bulkhead 108. Referring generally to FIG. 5, by way of examples, the present disclosure is also directed to a system 200 for making the pressure bulkhead assembly 100. In one or more examples, the method 1000 is implemented using the system 200.

Examples of the system 200 and method 1000 use measurements of the aft pressure bulkhead 108 to determine a surface profile of the aft pressure bulkhead 108 and to determine positions of pre-drilled full-size holes in the aft pressure bulkhead 108. Examples of the system 200 and method 1000 use measurements of the plurality of splice angles 102 to determine a surface profile of each one of the plurality of splice angles 102. Examples of the system 200 and method 1000 use the determined surface profile of the aft pressure bulkhead 108 and the determined surface profiles of the plurality of splice angles 102 to virtually fit the plurality of splice angles 102 at an optimized position about the aft pressure bulkhead 108 for assembly of the pressure bulkhead assembly 100. Examples of the system 200 and method 1000 use the virtual fit and the determined positions of pre-drilled full-size holes in the aft pressure bulkhead 108 to determine positions of full-size holes to be drilled in each one of the plurality of splice angles 102 so that the plurality of splice angles 102 are indexed at the optimized position when joined to the aft pressure bulkhead 108.

Examples of the system 200 and method 1000 facilitate drilling the full-size holes in each one of the plurality of splice angles 102 at the determined positions so that the full-size holes drilled in the splice angles 102 correspond to the pre-drilled full-size holes in the aft pressure bulkhead 108. Examples of the system 200 and method 1000 also facilitate installation of the splice angles 102 on the aft pressure bulkhead 108 using a plurality of fasteners inserted through aligned pairs of full-size holes in the splice angles 102 and full-size holes in the aft pressure bulkhead 108 so that the plurality of splice angles 102 are joined to the aft pressure bulkhead 108 at the optimized position.

Examples of the system 200 and method 1000 facilitate identifying dimensions of gaps formed between the aft pressure bulkhead 108 and the plurality of splice angles 102 and forming the plurality of shims 128 based on those gap dimensions. Examples of the system 200 and method 1000 also facilitate determining positions of full-size holes to be drilled in the shims 128 and drilling the full-size holes in the shims 128 at the determine positions. Examples of the system 200 and method 1000 further facilitate installing the plurality of shims 128 between the aft pressure bulkhead 108 and the plurality of splice angles 102 so that the plurality of splice angles 102 are joined to the aft pressure bulkhead 108 at the optimized position.

Referring now to FIG. 1, which schematically illustrates an example of the pressure bulkhead assembly 100. The pressure bulkhead assembly 100 includes, or is formed of, the aft pressure bulkhead 108 and the splice angles 102. The splice angles 102 are positioned adjacent to one another and are joined to the aft pressure bulkhead 108. The splice angles 102 form a circumferential splice surface 106. The circumferential splice surface 106 has an optimized shape 136.

Figure 12:
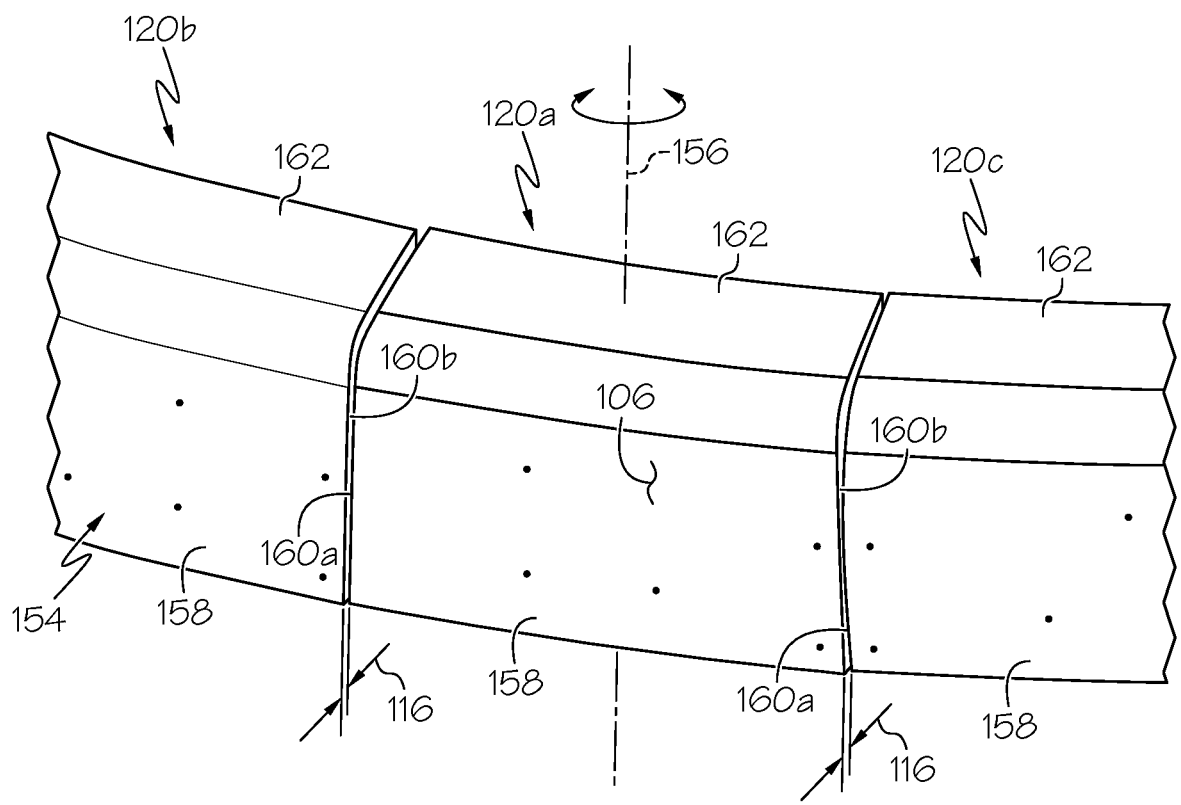
FIG. 12 is a schematic, perspective view of a portion of the splice-angle scans shown in FIG. 10 being adjusted from the initial position to an optimized position.
Figure 13:
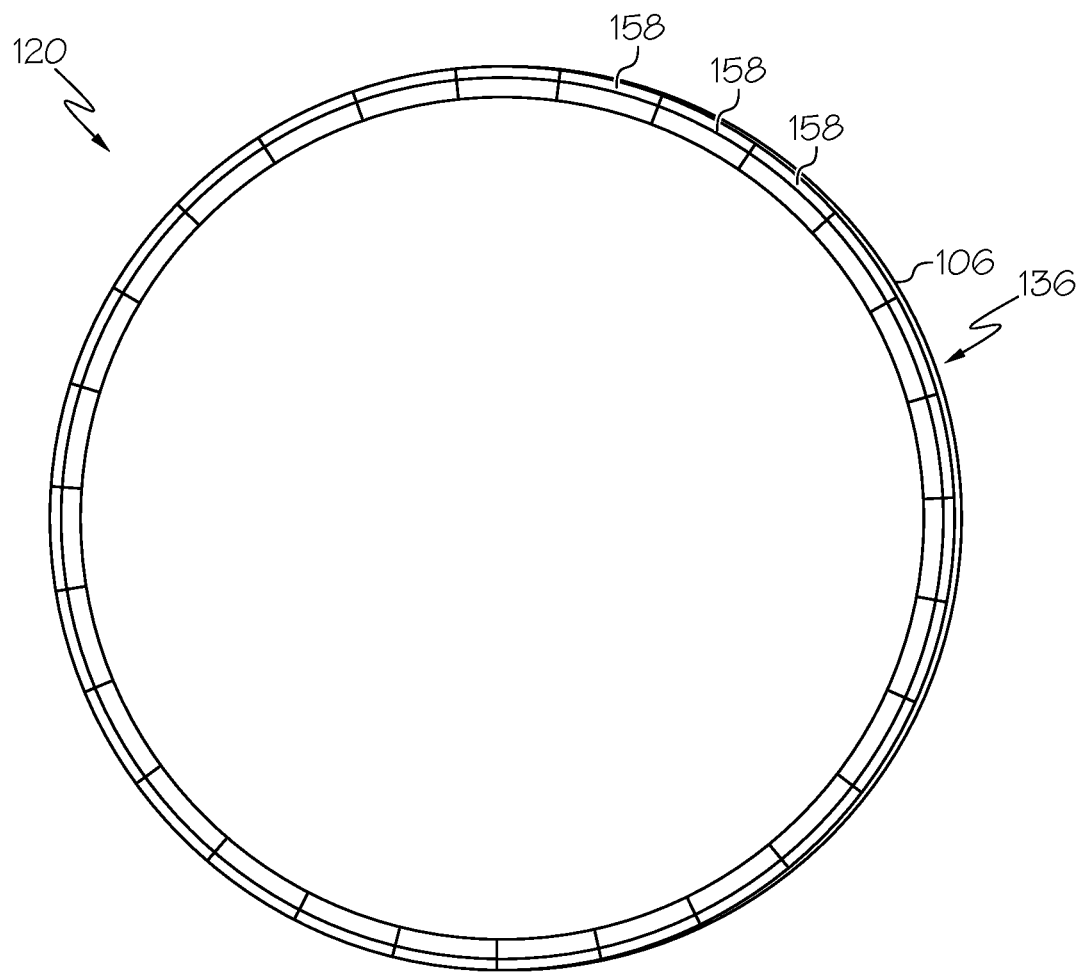
FIG. 13 is a schematic illustration of the plurality of splice-angle scans, representing the plurality of splice angles, at the optimized position in which the circumferential splice surface of the pressure bulkhead assembly has an optimized shape.
Figure 14:
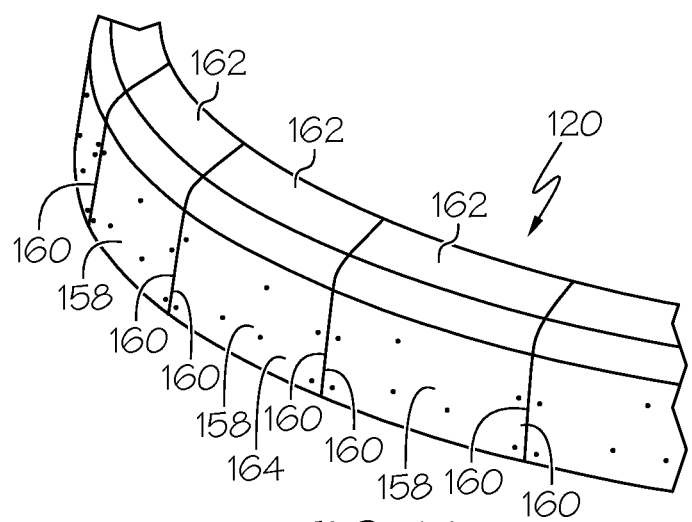
FIG. 14 is a schematic, perspective view of a portion of the splice-angle scans shown in FIG. 13.

For the purpose of the present disclosure, the optimized shape 136 of the circumferential splice surface 106 refers to a shape of the circumferential splice surface 106 that is optimized to be as close to circular as feasible, given manufacturing tolerances. As will be described in more detail herein, the optimized shape 136 of the circumferential splice surface 106 is achieved by determining the optimized position of each one of the splice angles 102 such that a step, or offset, between mating edges of directly adjacent ones of the splice angles 102 is minimized. In one or more examples, the optimized shape 136 is approximately circular in which a step dimension 116 (e.g., as shown in FIG. 12) between a mating edge 118 of each one of the plurality of splice angles 102 and the mating edge 118 of a directly adjacent one of the plurality of splice angles 102 is minimized (e.g., as shown in FIGS. 13 and 14).

Figure 6:
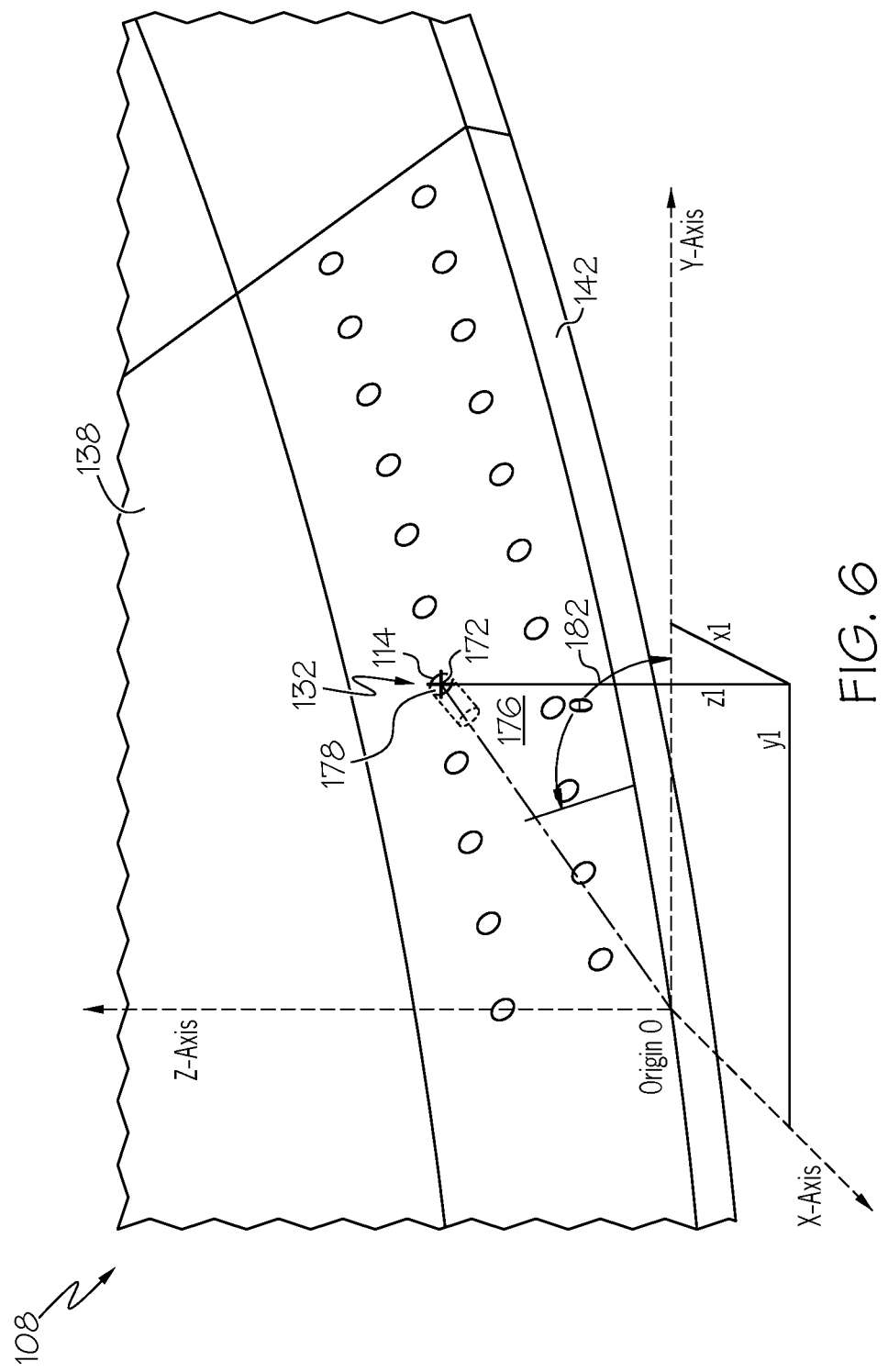
FIG. 6 is a schematic, cut away, perspective view of an example of a portion of a first bulkhead surface of an aft pressure bulkhead of the pressure bulkhead assembly.
Figure 7:
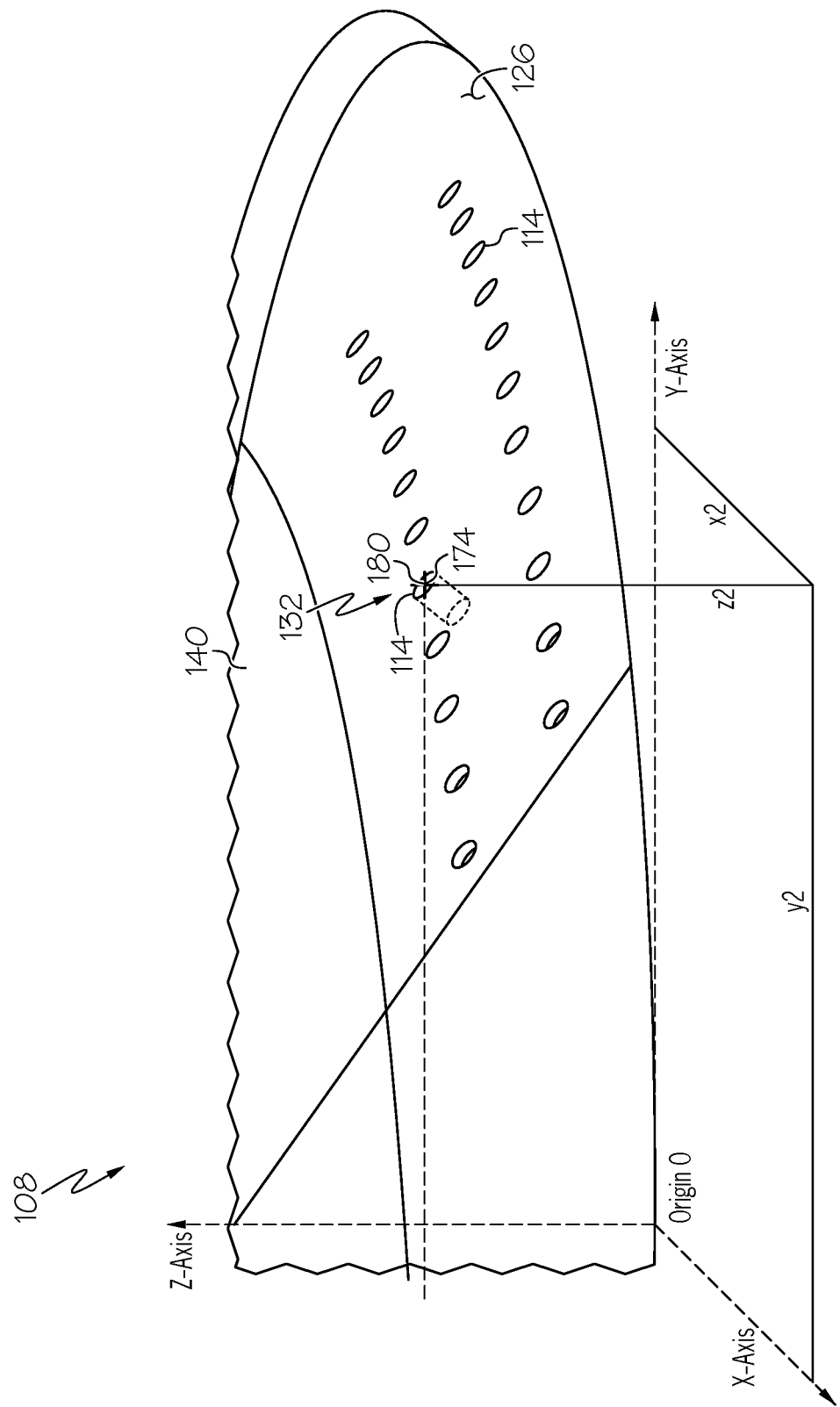
FIG. 7 is a schematic, cut away, perspective view of an example of a portion of a second bulkhead surface of the aft pressure bulkhead of the pressure bulkhead assembly.
Figure 8:
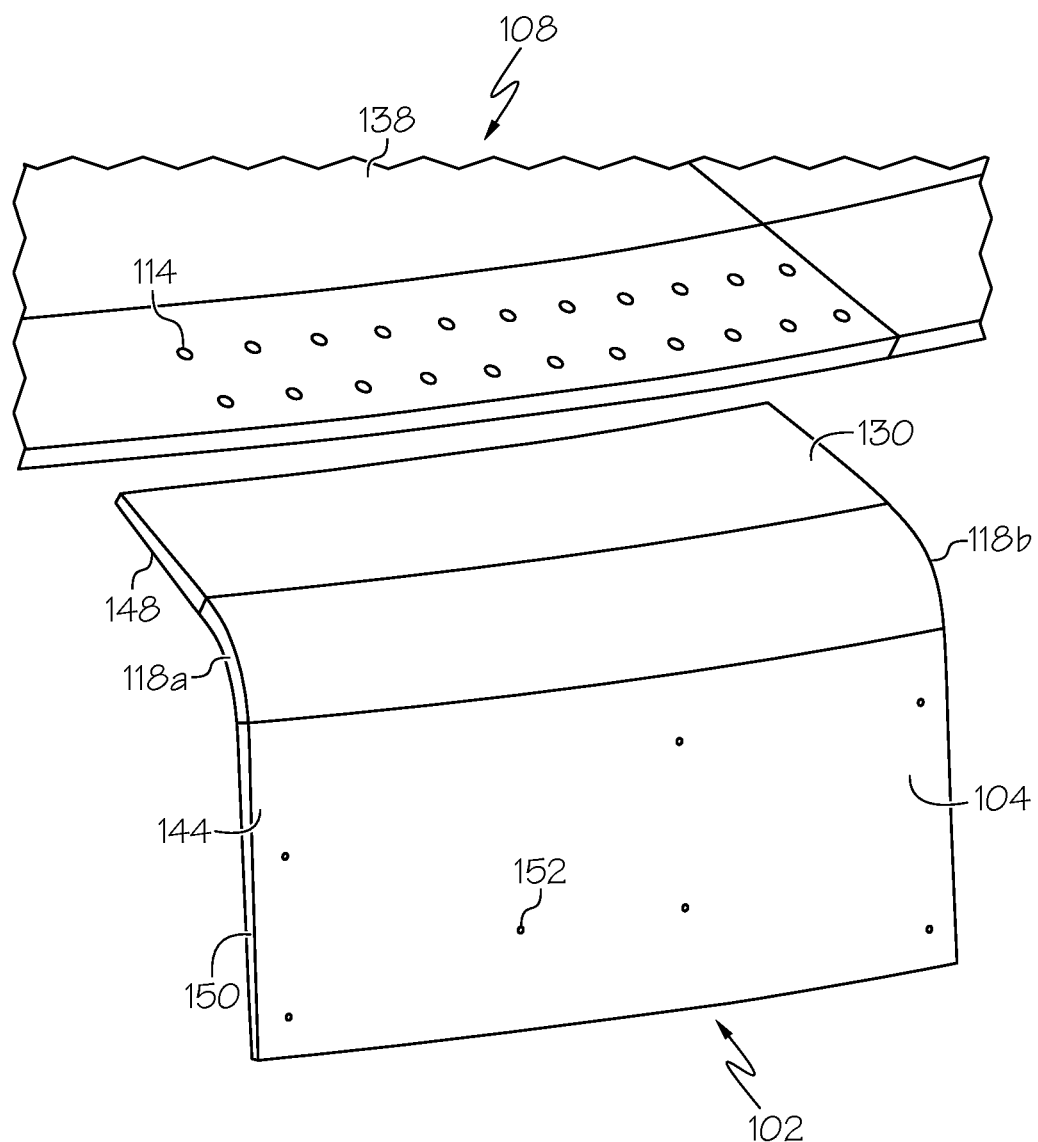
FIG. 8 is a schematic, perspective view of an example of a splice angle configured to be installed on the aft pressure bulkhead to form the pressure bulkhead assembly.
Figure 9:
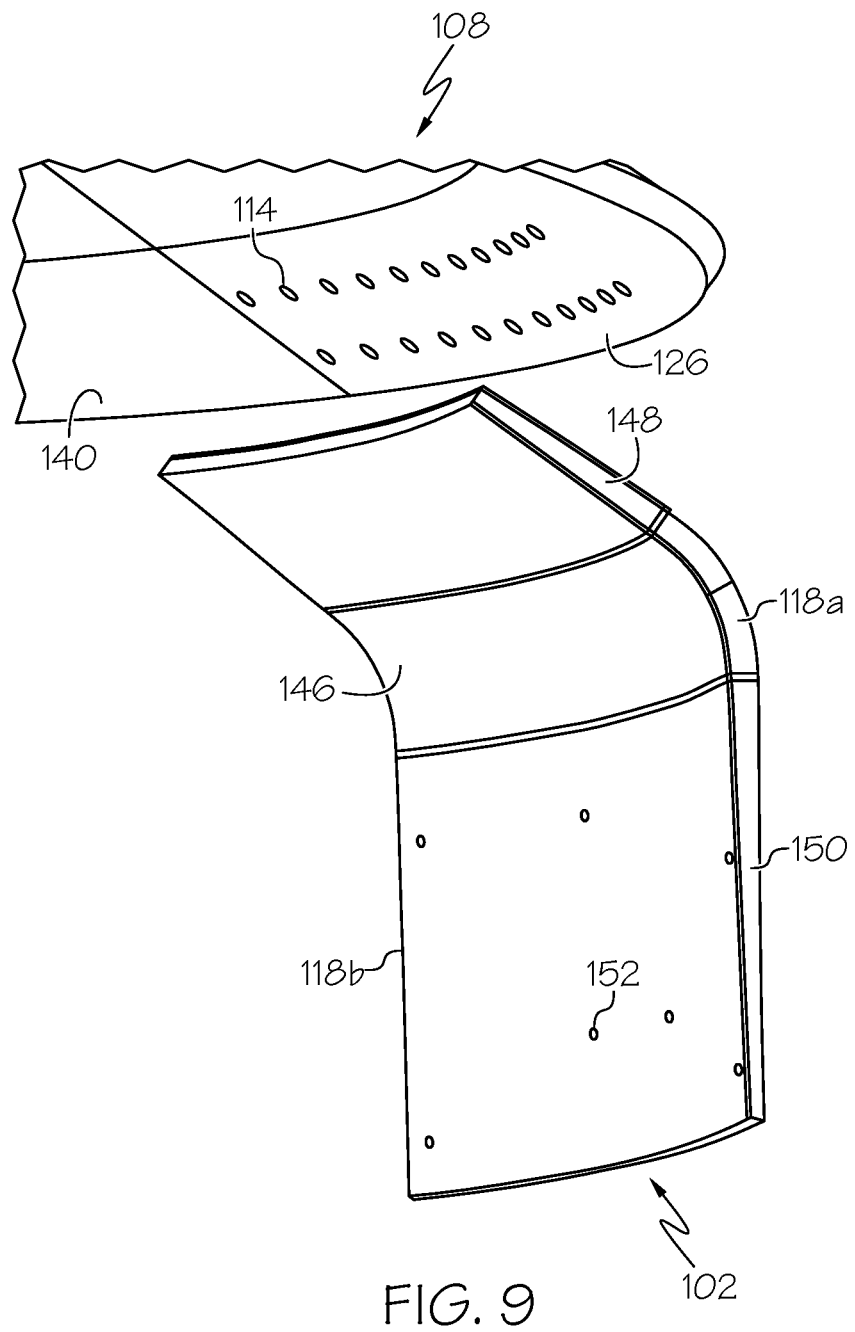
FIG. 9 is a schematic, perspective view of an example of the splice angle configured to be installed on the aft pressure bulkhead to form the pressure bulkhead assembly.

In one or more examples, the aft pressure bulkhead 108 includes a bulkhead interface surface 126 (e.g., as shown in FIGS. 7 and 9) and a plurality of aft-pressure-bulkhead holes 114 (e.g., as shown in FIGS. 6-9). The aft-pressure-bulkhead holes 114 are pre-drilled through the bulkhead interface surface 126.

Figure 16:
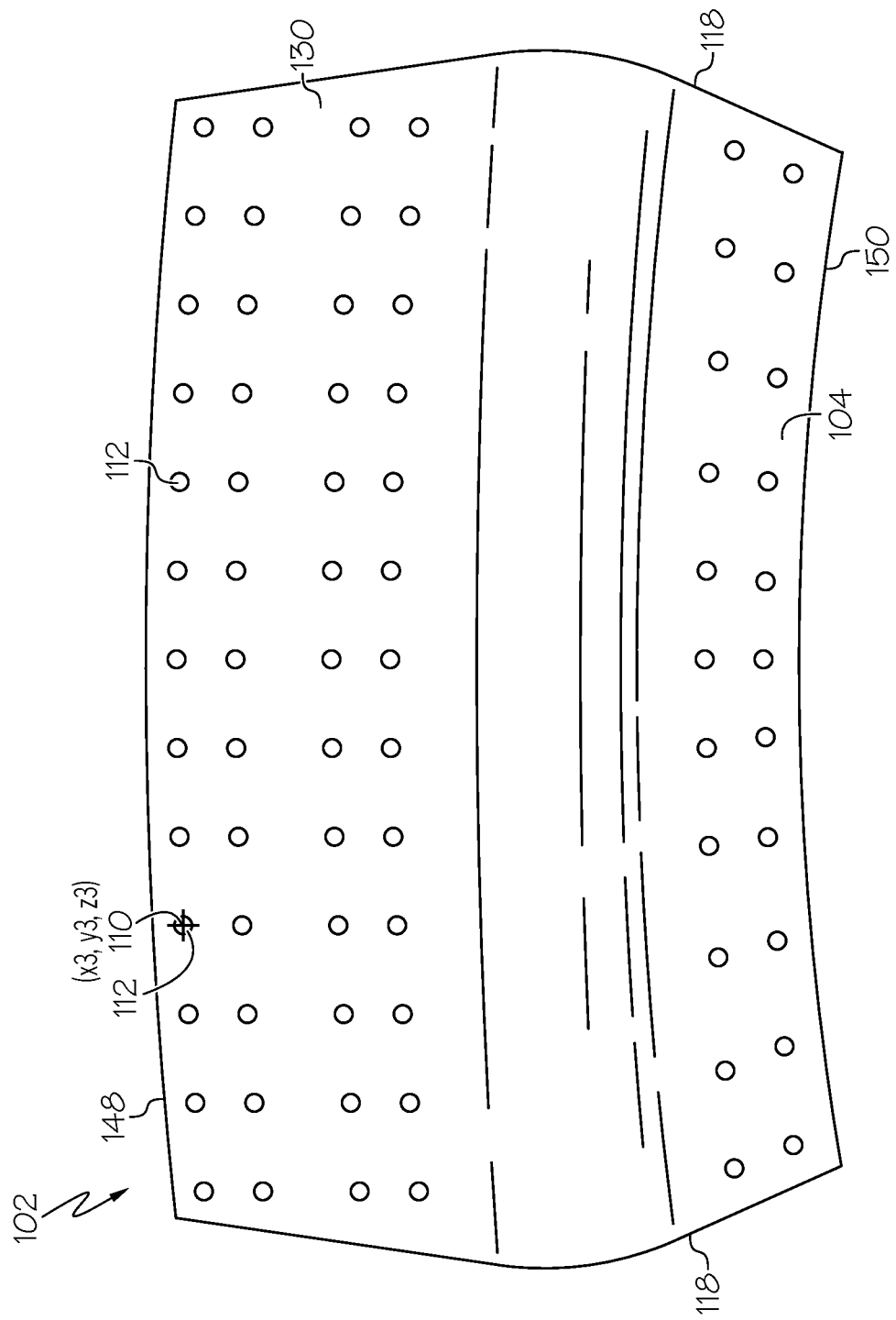
FIG. 16 is a schematic, perspective view of an example of the splice angle shown in FIGS. 8 and 9 with a plurality of splice-angle holes drilled therein.

In one or more examples, the splice angles 102 are configured to be coupled to (e.g., installed on or otherwise fastened to) the aft pressure bulkhead 108. Each one of the splice angles 102 incudes a flange surface 130, a plurality of splice-angle holes 112, and a splice surface 104 (e.g., as shown in FIGS. 8, 9 and 16). The flange surface 130 is configured to mate with the bulkhead interface surface 126. The splice-angle holes 112 are drilled through the flange surface 130. The splice surface 104 extends from the flange surface 130. With the splice-angle holes 112 aligned with the aft-pressure-bulkhead holes 114, a plurality of splice surfaces 104 forms the circumferential splice surface 106 with the optimized shape 136.

In one or more examples, splice-angle-hole positions 110 (e.g., as shown in FIG. 16) of the splice-angle holes 112 are determined based on: (1) a virtual fit between the splice angles 102, at the optimized position, and the aft pressure bulkhead 108; and (2) measured aft-pressure-bulkhead-hole positions 132 (e.g., as shown in FIGS. 6 and 7) of the aft-pressure-bulkhead holes 114.

For the purpose of the present disclosure, the "position" of a hole refers to a location (e.g., along an X-axis, a Y-axis and a Z-axis) and the angular orientation (e.g., about the X-axis, the Y-axis and the Z-axis) of the hole in three-dimensional space (e.g., relative to a three-dimensional coordinate system).

Figure 17:
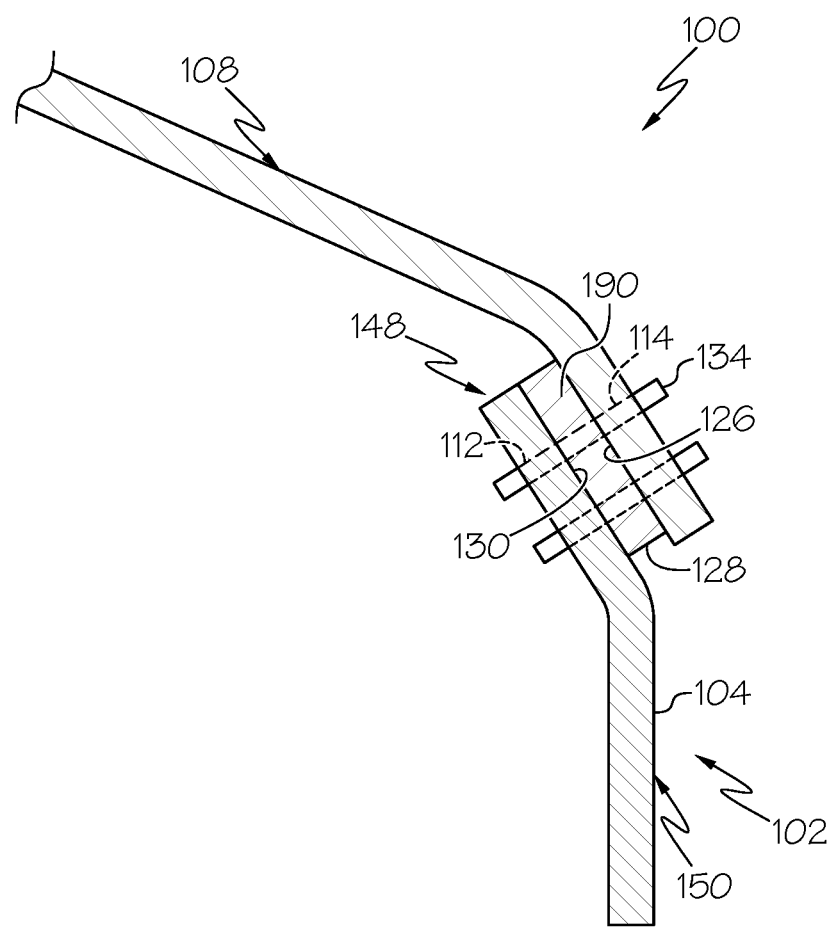
FIG. 17 is a schematic, sectional view of an example of the pressure bulkhead assembly.

In one or more examples, the pressure bulkhead assembly 100 includes a plurality of fasteners 134 (e.g., as shown in FIGS. 5 and 17). The fasteners 134 are inserted through the splice-angle holes 112 and the aft-pressure-bulkhead holes 114 to fasten the plurality of splice angles 102 to the aft pressure bulkhead 108.

Figure 18:
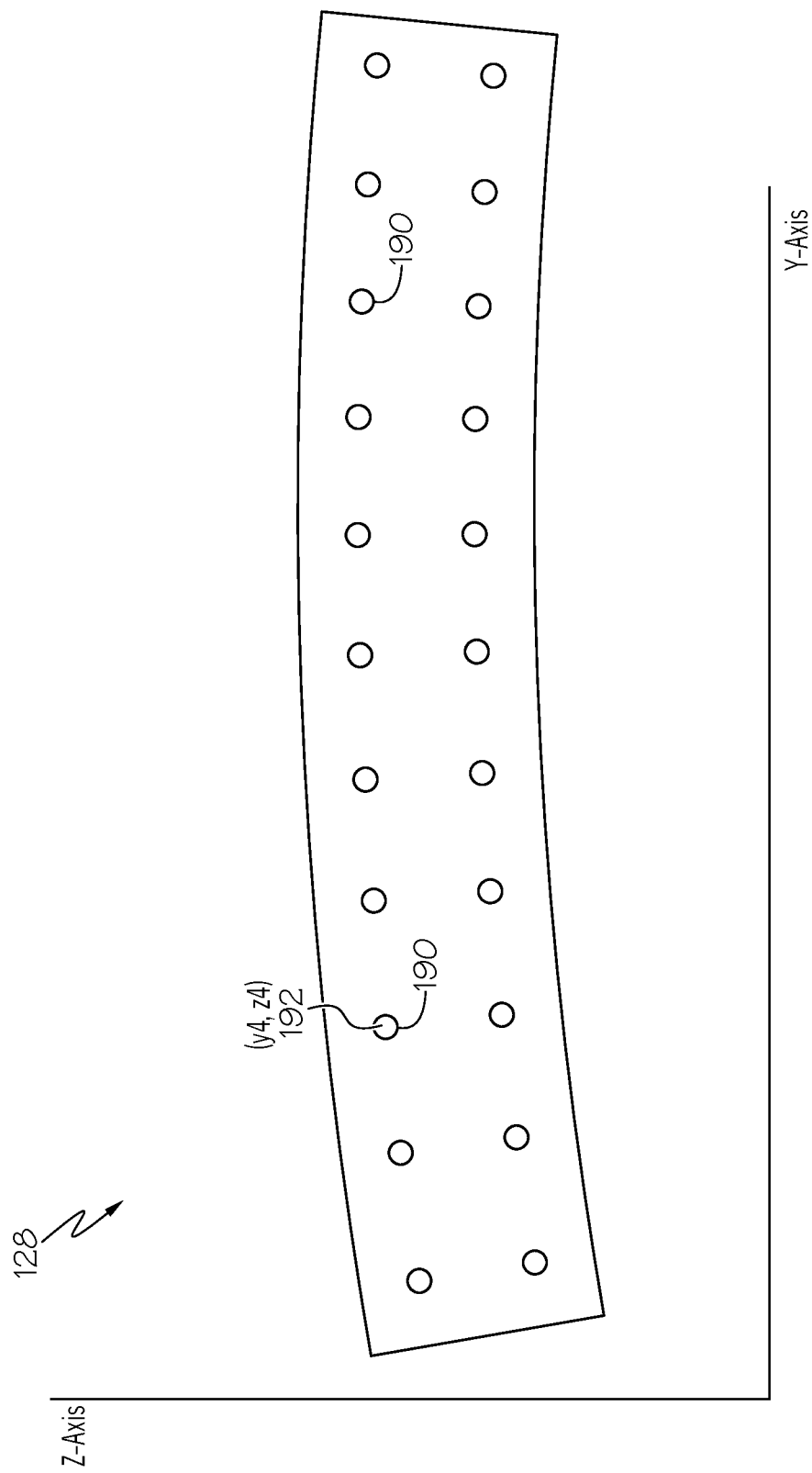
FIG. 18 is a schematic, plan view of an example of a shim of the pressure bulkhead assembly with shim holes drilled therein.

In one or more examples, the pressure bulkhead assembly 100 includes a shim 128 (e.g., as shown in FIGS. 17 and 18). The shim 128 is positioned between the flange surface 130 of one of the splice angles 102 and the bulkhead interface surface 126 of the aft pressure bulkhead 108 (e.g., as shown in FIG. 17).

Figure 2:
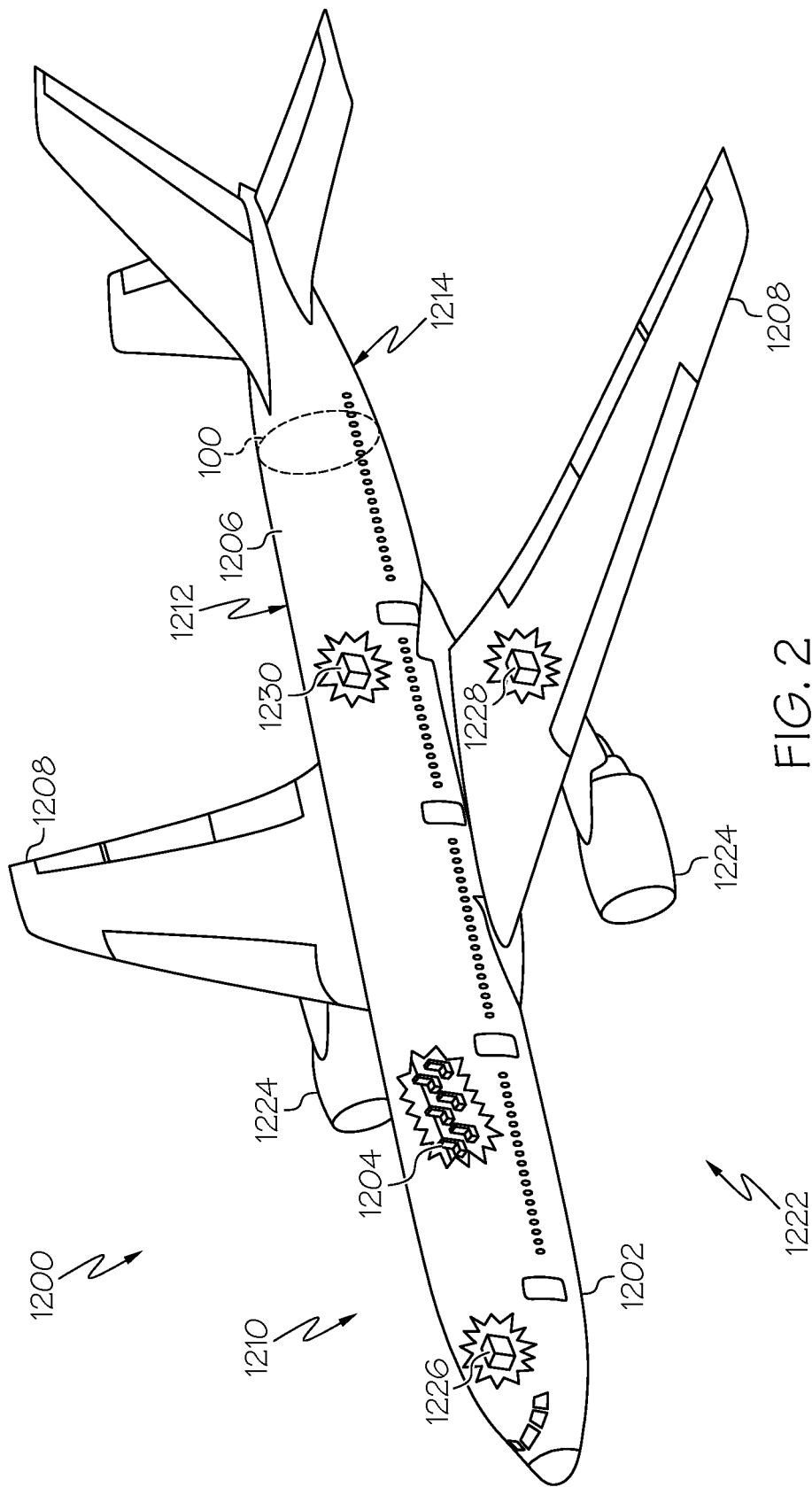
FIG. 2 is a schematic illustration of an example of an aircraft that includes the pressure bulkhead assembly.

In one or more examples, the aft pressure bulkhead 108 takes the form of a panel, a disk or a dome (e.g., is dome-shaped). Accordingly, the aft pressure bulkhead 108 is also referred to as an aft pressure bulkhead dome or as an aft pressure bulkhead panel. For simplicity, the aft pressure bulkhead may be referred to herein or in the accompanying figures as "APB". Generally, the pressure bulkhead assembly 100 is sized and shaped for placement inside a fuselage 1202 of an aircraft 1200 (e.g., as shown in FIG. 2) such that the aft pressure bulkhead 108 separates a pressurized portion of an interior 1204 (FIG. 2) of the aircraft 1200 (e.g., a pressurized cabin) from an unpressurized portion of the interior 1204 and the splice angles 102 form a pressure seal. In one or more examples, the pressure bulkhead assembly 100 is attached to a skin 1206 (FIG. 2) of the fuselage 1202 via the splice angles 102.

The aft pressure bulkhead 108 and the splice angles 102 are formed of any suitable material. In one or more examples, the aft pressure bulkhead 108 and the splice angles 102 are formed of a composite material. In one or more examples, the aft pressure bulkhead 108 and the splice angles 102 are formed of a metallic material, a polymeric material, another suitable material, or a combination of materials. The material of the aft pressure bulkhead 108 and the material of the splice angles 102 may be the same or different.

Referring now to FIG. 2, which schematically illustrates an example of the aircraft 1200 in which pressure bulkhead assembly 100 is used. The pressure bulkhead assembly 100 divides a pressurized side of the aircraft 1200 from an unpressurized side of the aircraft 1200. The splice angles 102 (FIG. 1) are installed on the aft pressure bulkhead 108 (FIG. 1) on the pressurized side of the aft pressure bulkhead 108. As an example, the aircraft 1200 includes the fuselage 1202 and wings 1208 attached to and outwardly extending from the fuselage 1202. The fuselage 1202 includes a plurality of fuselage sections (e.g., barrel sections). The fuselage 1202 (e.g., each fuselage section) has the skin 1206, coupled to an airframe 1210, that forms an exterior of the aircraft 1200. The pressure bulkhead assembly 100 separates a first fuselage section 1212 (e.g., pressurized side) from a second fuselage section 1214 (e.g., unpressurized side) in an aft portion of the fuselage 1202. For example, in FIG. 3, arrow 1216 indicates a direction of a forward (e.g., pressurized) portion of the aircraft 1200.

Figure 3:
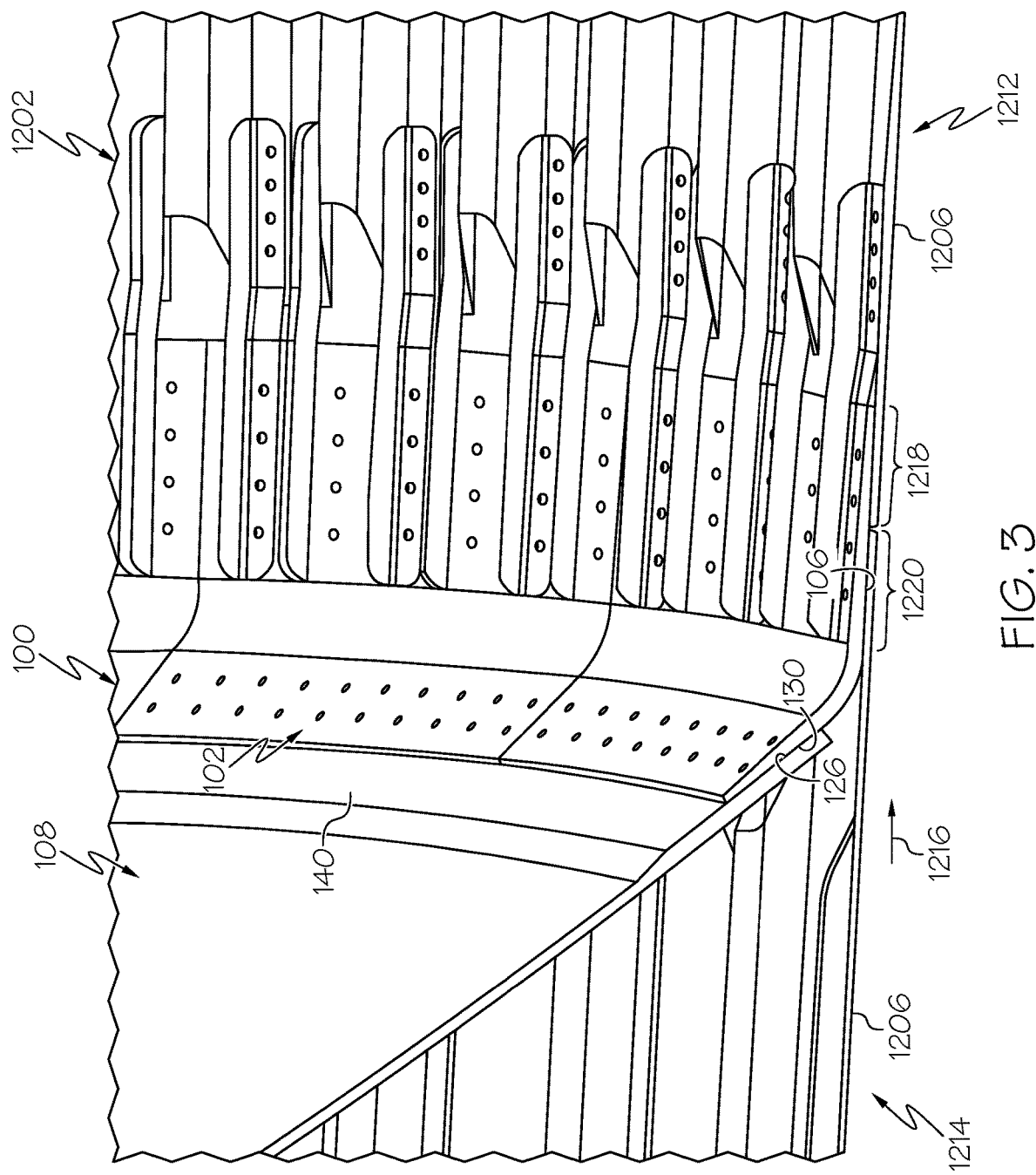
FIG. 3 is a schematic, cut away, perspective view of an example of a portion of the pressure bulkhead assembly coupled to a fuselage of the aircraft.

Referring now to FIG. 3, which schematically illustrates an example of a portion of the pressure bulkhead assembly 100 attached to the first fuselage section 1212 and the second fuselage section 1214, viewed from within the fuselage 1202. The splice angles 102 overlap a first skin-portion 1218 of the skin 1206 of the first fuselage section 1212 and a second skin-portion 1220 of the skin 1206 of the second fuselage section 1214. The splice angles 102 are attached (e.g., fastened by a plurality of fasteners) to the first skin-portion 1218 and to the second skin-portion 1220. In this manner, the splice angles 102 join the aft pressure bulkhead 108, the first fuselage section 1212 and the second fuselage section 1214 together. Accordingly, the splice angles 102 are also referred to as skin splice angles.

As an example, during fabrication of the aircraft 1200, the pressure bulkhead assembly 100 is attached to the second fuselage section 1214 by fastening the splice angles 102 to the second skin-portion 1220. The first fuselage section 1212 is then positioned adjacent to the second fuselage section 1214 such that the splice angles 102 overlap the first skin-portion 1218. The pressure bulkhead assembly 100 is attached to the first fuselage section 1212 by fastening the splice angles 102 to the first skin-portion 1218. The optimized shape 136 (FIG. 1) of the circumferential splice surface 106, formed by the splice angles 102, is approximately complementary to the barrel (e.g., circular) shape of the skins 1206 of the first fuselage section 1212 and the second fuselage section 1214. Accordingly, the splice angles 102 are positioned on the pressurized side of the aft pressure bulkhead 108 and are configured to form a pressure seal for the fuselage 1202 (FIG. 2) between the first fuselage section 1212 (e.g., pressurized section) and the second fuselage section 1214 (e.g., unpressurized section).

In one or more examples, one or more splice-to-skin shims (not shown in FIG. 3) are positioned between the circumferential splice surface 106 of the splice angles 102 and the skin 1206 to fill any gaps that exist between the splice angles 102 and the first skin-portion 1218 and/or the second skin-portion 1220, for example, in areas where the circumferential splice surface 106 does not contact the skin 1206 of the first fuselage section 1212 and/or the second fuselage section 1214 (e.g., where the optimized shape 136) (FIG. 1) of the circumferential splice surface 106 does not match the barrel shape of the first fuselage section 1212 and/or the second fuselage section 1214).

Referring now to FIG. 4, which illustrates an example of the method 1000. In one or more examples, the method 1000 includes a step of (block 1002) making, or forming, the aft pressure bulkhead 108. In one or more examples, the method 1000 includes a step of (block 1004) drilling aft-pressure-bulkhead holes 114 through the aft pressure bulkhead 108.

Referring now to FIGS. 6 and 7, which schematically illustrates an example of a portion of a first bulkhead surface 138 and a portion of a second bulkhead surface 140 of the aft pressure bulkhead 108, respectively. In one or more examples, the aft pressure bulkhead 108 is initially made, or otherwise fabricated, with the plurality of aft-pressure-bulkhead holes 114. For example, the aft pressure bulkhead 108 can be attached to an assembly jig or support tooling for drilling the aft-pressure-bulkhead holes 114.

The aft-pressure-bulkhead holes 114 are pre-drilled in the aft pressure bulkhead 108 and are full-size holes configured to receive corresponding fasteners 134 (e.g., as shown in FIG. 17). Accordingly, the aft-pressure-bulkhead holes 114 are also referred to as pre-drilled, full-size holes or aft-pressure-bulkhead fastener holes. The aft-pressure-bulkhead holes 114 are drilled at pre-defined positions on the aft pressure bulkhead 108. The pre-defined position of each one of the aft-pressure-bulkhead holes 114 refers to the pre-determined, actual (e.g., physical, real world) position of the aft-pressure-bulkhead hole 114 on the aft pressure bulkhead 108, as drilled.

In one or more examples, the aft pressure bulkhead 108 includes the first bulkhead surface 138 (e.g., as shown in FIG. 6) and the second bulkhead surface 140 (e.g., as shown in FIG. 7), opposite the first bulkhead surface 138. The aft pressure bulkhead 108 also has a thickness 142 (FIG. 6) defined between the first bulkhead surface 138 and the second bulkhead surface 140.

In one or more examples, the first bulkhead surface 138 is, or forms, an outer mold line (OML) of the aft pressure bulkhead 108 and the second bulkhead surface 140 is, or forms, an inner mold line (IML) of the aft pressure bulkhead 108. Accordingly, the first bulkhead surface 138 is also referred to as an outer surface and the second bulkhead surface 140 is also referred to as an inner surface. With the pressure bulkhead assembly 100 installed within the fuselage 1202 of the aircraft 1200 (e.g., as shown in FIG. 3), the first bulkhead surface 138 is on a unpressurized side of the aft pressure bulkhead 108 and the second bulkhead surface 140 is on the pressurized side of the aft pressure bulkhead 108.

The second bulkhead surface 140 includes (e.g., a portion of the second bulkhead surface 140 forms) the bulkhead interface surface 126 (e.g., an aft-pressure-bulkhead interface surface). The bulkhead interface surface 126 is located adjacent to a peripheral edge of the aft pressure bulkhead 108 and extends along an approximately circular path. The bulkhead interface surface 126 is configured to mate with the splice angles 102 during installation of the splice angles 102 on the aft pressure bulkhead 108. In other words, the bulkhead interface surface 126 serves as a faying surface that contacts the splice angles 102 at a joint between the splice angles 102 and the aft pressure bulkhead 108 during assembly of the pressure bulkhead assembly 100 (FIG. 1).

The aft-pressure-bulkhead holes 114 are drilled through the thickness 142 of the aft pressure bulkhead 108 (e.g., extend between the first bulkhead surface 138 and the second bulkhead surface 140). The pre-defined positions of the aft-pressure-bulkhead holes 114 locate the aft-pressure-bulkhead holes 114 through the bulkhead interface surface 126, for example, along an approximately circular path proximate (e.g., at or near) the peripheral edge of the aft pressure bulkhead 108.

Only some of the aft-pressure-bulkhead holes 114 are shown in FIGS. 6 and 7 (e.g., aft-pressure-bulkhead holes 114 in a section of the aft pressure bulkhead 108) for the purpose of clarity of illustration. While not explicitly illustrated in FIGS. 6 and 7, it should be understood that the aft-pressure-bulkhead holes 114 extend around an entirety of the aft pressure bulkhead 108 (e.g., as shown in FIG. 1).

Referring again to FIG. 4, in one or more examples, the method 1000 includes a step of (block 1006) making the splice angles 102 (FIGS. 8 and 9). The splice angles 102 are initially made, or otherwise fabricated, without a plurality of holes (e.g., pre-drilled, full size holes).

Referring now to FIGS. 8 and 9, which schematically illustrate an example of a first splice-angle surface 144 and a second splice-angle surface 146, respectively, of one of the splice angles 102 relative to the aft pressure bulkhead 108. The splice angle 102 illustrated in FIGS. 8 and 9 is representative of any one of the plurality of splice angles 102.

In one or more examples, the splice angle 102 includes the first splice-angle surface 144 (e.g., as shown in FIG. 8) and the second splice-angle surface 146 (e.g., as shown in FIG. 9), opposite the first splice-angle surface 144. The splice angle 102 also has a thickness defined between the first splice-angle surface 144 and the second splice-angle surface 146.

In one or more examples, the first splice-angle surface 144 is, or forms, an outer mold line (OML) of the splice angle 102 and the second splice-angle surface 146 is, or forms, an inner mold line (IML) of the splice angle. Accordingly, the first splice-angle surface 144 is also referred to as an outer surface and the second splice-angle surface 146 is also referred to as an inner surface. With the pressure bulkhead assembly 100 installed within the fuselage 1202 of the aircraft 1200 (e.g., as shown in FIG. 3), the first splice-angle surface 144 generally faces radially outward and the second splice-angle surface 146 generally faces radially inward.

In one or more examples, the splice angle 102 includes a flange 148. The flange 148 includes (e.g., a portion of the first splice-angle surface 144 forms) the flange surface 130

(e.g., a splice-angle interface surface). The flange surface 130 is configured to mates with the bulkhead interface surface 126 of the aft pressure bulkhead 108 during installation of the splice angles 102 on the aft pressure bulkhead 108. In other words, the flange surface 130 serves as a faying surface that contacts the bulkhead interface surface 126 at the joint between the splice angle 102 and the aft pressure bulkhead 108 during assembly of the pressure bulkhead assembly 100 (FIG. 1).

In one or more examples, the splice angle 102 includes a skin splice 150 that extends from the flange 148 at an oblique angle. The skin splice 150 includes (e.g., a portion of the first splice-angle surface 144 forms) the splice surface 104. The splice surface 104 forms an arcuate segment of the circumferential splice surface 106 (e.g., shown in FIG. 1).

The splice angle 102 includes an opposed pair of mating edges 118 (e.g., identified as a first mating edge 118a and a second mating edge 118b in FIGS. 1, 8 and 9). During installation of the splice angles 102 on the aft pressure bulkhead 108, one of the mating edges 118 (e.g., the first mating edge 118a) of one of the splice angles 102 abuts one of the mating edges 118 (e.g., the second mating edge 118b) of a directly adjacent one of the splice angles 102 (e.g., as shown in FIG. 1).

In one or more examples, the splice angle 102 is fabricated with pilot holes 152 that are drilled through the skin splice 150. The pilot holes 152 are drilled at positions that approximately correspond to locations where full-size holes will be drilled through the skin splice 150 of the splice angle 102, the first skin-portion 1218, and the second skin-portion 1220 during installation of the pressure bulkhead assembly 100 in the fuselage 1202 (e.g., as shown in FIG. 3).

Referring again to FIG. 4, in one or more examples, the method 1000 includes a step of (block 1008) measuring the aft pressure bulkhead 108. In one or more examples, the step of (block 1008) measuring the aft pressure bulkhead 108 provides (e.g., generates) three-dimensional (3D) measurement data representing the 3D geometry of the aft pressure bulkhead 108.

In one or more examples, the step of (block 1008) measuring the aft pressure bulkhead 108 includes a step of measuring the bulkhead interface surface 126 and a step of measuring the aft-pressure-bulkhead holes 114. It can be appreciated that an entirety of or other portions of the aft pressure bulkhead 108 may also be measured, such as an entirety of the first bulkhead surface 138, an entirety of the second bulkhead surface 140, and/or the peripheral edge of the aft pressure bulkhead 108.

In one or more examples, the method 1000 includes a step of (block 1010) measuring the splice angles 102 (e.g., each one of the splice angles 102). In one or more examples, the step of (block 1010) measuring the splice angles 102 provides (e.g., generates) 3D measurement data representing the 3D geometry of each one of the splice angles 102.

In one or more examples, the step of (block 1010) measuring the splice angles 102 includes a step of measuring the first splice-angle surface 144 of the splice angles 102 (e.g., of each one of the splice angles 102), such as measuring the flange surface 130 and measuring the splice surface 104. In one or more examples, the step of (block 1010) measuring the splice angles 102 includes a step of measuring the pilot holes 152. It can be appreciated that an entirety of or other portions of the splice angle 102 may also be measured, such as an entirety of the first splice-angle surface 144, an entirety of the second splice-angle surface 146, and/or the pair of mating edges 118.

In one or more examples, the method 1000 includes a step of (block 1012) generating a plurality of splice-angle scans 120 (e.g., as shown in FIG. 5). In one or more examples, the splice-angle scans 120 are generated using the 3D measurement data obtained during the measuring step (e.g., block 1010). Accordingly, the splice-angle scan 120 is a virtual model or 3D digital representation of the splice angle 102, such as of the surface (e.g., a 3D surface profile) of the splice angle 102 and, optionally, other geometric features of the splice angle 102. Each one of the splice-angle scans 120 represents (e.g., is a 3D digital representation of) a corresponding one of the splice angles 102.

Figure 10:
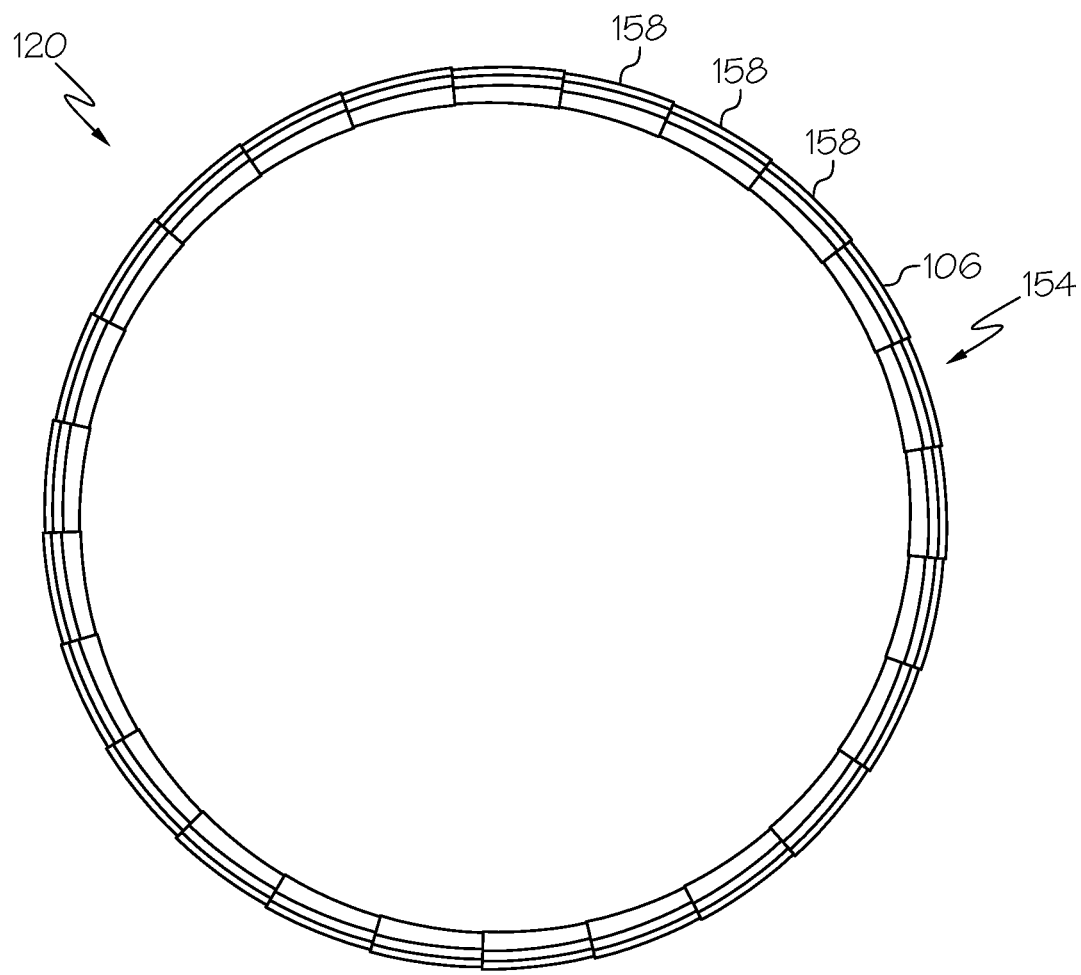
FIG. 10 is a schematic illustration of a plurality of splice-angle scans, representing a plurality of splice angles, at an initial position in which a circumferential splice surface of the pressure bulkhead assembly has an initial shape.
Figure 11:
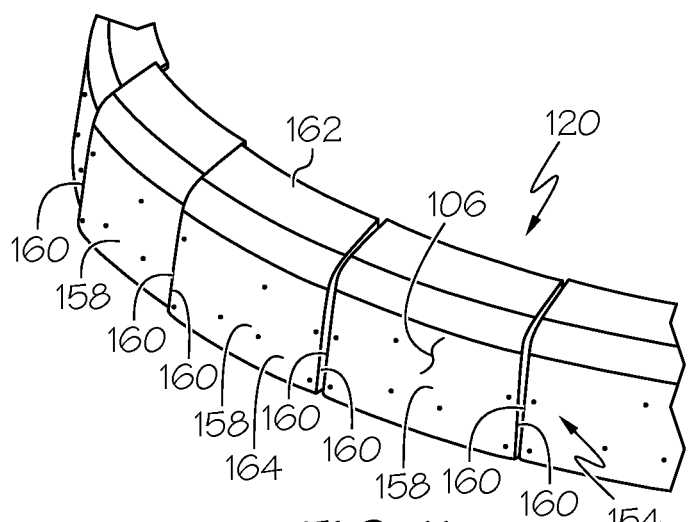
FIG. 11 is a schematic, perspective view of a portion of the splice-angle scans shown in FIG. 10.

In one or more examples, the splice-angle scan 120 represents at least a portion of the first splice-angle surface 144 (FIG. 8). Optionally, the splice-angle scan 120 represents at least a portion of the second splice-angle surface 146 of the splice angle 102. In one or more examples, the splice-angle scan 120 includes a splice-surface scan 158 (e.g., as shown in FIGS. 10-14) representing the splice surface 104 (FIG. 8). In one or more examples, the splice-angle scan 120 includes a flange-surface scan 162 (e.g., as shown in FIGS. 11, 12 and 14) representing the flange surface 130 (FIG. 8). In one or more examples, the splice-angle scan 120 includes mating-edge scans 160 (e.g., as shown in FIGS. 11, 12 and 14) representing the mating edges 118 (FIGS. 8 and 9) of the splice angle 102. In one or more examples, the splice-angle scan 120 includes pilot-hole scans 164 (e.g., as shown in FIGS. 11 and 14) representing the pilot holes 152 of the splice angle 102.

In one or more examples, the method 1000 includes a step of (block 1014) aligning (e.g., virtually aligning) the splice-angle scans 120 to a nominal model 122 (FIG. 5) of the pressure bulkhead assembly 100. The nominal model 122 is a 3D design model, such as a computer aided design (CAD) model, that represents the pressure bulkhead assembly 100 having the circumferential splice surface 106 with a nominal shape (e.g., a design shape). The step of (block 1014) aligning the splice-angle scans 120 to the nominal model 122 arranges the plurality of splice-angle scans 120 at an initial position in which the splice-angle scans 120 are positioned adjacent to one another and a plurality of splice-surface scans 158 of the splice-angle scans 120 represents the circumferential splice surface 106 with an initial shape 154 (e.g., as shown in FIGS. 10 and 11).

Accordingly, the initial position of the splice-angle scans 120 is a position of the splice-angle scans 120 following the alignment of the splice-angle scans 120 to the nominal model 122. The initial shape 154 of the circumferential splice surface 106 is the shape of the circumferential splice surface 106 represented by the splice-surface scans 158 following alignment of the splice-angle scans 120 to the nominal model 122.

For the purpose of the present disclosure, the "position" (e.g., initial position, adjusted position, optimized position, etc.) of the splice angle 102 or the splice-angle scan 120 refers to a location (e.g., along an X-axis, a Y-axis and a Z-axis) and an angular orientation (e.g., about the X-axis, the Y-axis and the Z-axis) of the splice angle 102 or the splice-angle scan 120 in three-dimensional space (e.g., relative to a three-dimensional coordinate system).

In one or more examples, step of (block 1014) aligning the splice-angle scans 120 to a nominal model 122 includes a step of performing a best fit between each one of the plurality of splice-angle scans 120 and the nominal model 122. For example, alignment parameters are calculated by performing an optimized best fit of multiple points of the splice-angle scan 120 to a portion of the nominal model 122 representing the splice angles 102 of the pressure bulkhead assembly 100.

In one or more examples, the method 1000 includes a step of (block 1016) limiting degrees of freedom of each one of the splice-angle scans 120 relative to the nominal model 122 within a predetermined tolerance during the step of (block 1014) aligning the splice-angle scans 120 to the nominal model 122, such as while performing the best fit. The predetermined tolerance limits the magnitude of motion (e.g., linearly along the X-, Y-, and Z-axes and/or angularly about the X-, Y-, and Z-axes) of the splice-angle scan 120 relative to the nominal model 122 during the best fit analysis. In one or more examples, a feature of the splice angle 102 represented by the splice-angle scan 120 is used to limit the degrees of freedom. For example, motion (e.g., linear and/or angular) of the pilot-hole scans 164 of the splice-angle scan 120 is restricted to a predefined linear and/or angular dimension relative to a fixed coordinate system shared by the splice-angle scan 120 and the nominal model 122.

Referring now to FIGS. 10 and 11, which schematically illustrate an example of the splice-angle scans 120 arranged (e.g., virtually positioned) at the initial position following the step of (block 1014) aligning the splice-angle scans 120 to the nominal model 122 (FIG. 5) of the pressure bulkhead assembly 100. With the splice-angle scans 120 at the initial position, the mating-edge scans 160 of each one of the splice-angle scans 120 abut the mating-edge scan 160 of a directly adjacent one of the splice-angle scans 120. The splice-surface scans 158 (e.g., 3D surface profile) representing the splice surfaces 104 of the splice-angle scans 120 form a virtual representation of the circumferential splice surface 106 having the initial shape 154.

Referring again to FIG. 4, in one or more examples, the method 1000 includes a step of (block 1018) determining the step dimension 116 (e.g., as shown in FIG. 12) between the mating-edge scan 160 of each one of the splice-angle scans 120 and the mating-edge scan 160 of a directly adjacent one of the splice-angle scans 120. The step dimensions 116 are determined with the splice-angle scans 120 in the initial position.

Referring now to FIG. 12, which schematically illustrates an example of a portion of the splice-angle scans 120 arranged adjacent to one another in the initial position. As illustrated in FIG. 12, with the splice-angle scans 120 fit to the nominal model 122 (e.g., at the initial position), stepping can occur between the splice-surface scan 158 of adjacent ones of the splice-angle scans 120. An offset distance (e.g., step) between the splice-surface scans 158 of directly adjacent ones of the splice-angle scans 120 is defined (e.g., calculated) by the step dimension 116 between the abutted mating-edge scans 160 of the directly adjacent ones of the splice-angle scans 120. For example, in the initial position, a first mating-edge scan 160a of a first splice-angle scan 120a is offset relative to a second mating-edge scan 160b of a second splice-angle scan 120b that is directly adjacent to the first splice-angle scan 120a. The second mating-edge scan 160b of the first splice-angle scan 120a is offset relative to the first mating-edge scan 160a of a third splice-angle scan 120c that is directly adjacent to the first splice-angle scan 120a, opposite the second splice-angle scan 120b.

As such, if the splice angles 102 were to be joined with the aft pressure bulkhead 108 at the initial position, such stepping would form one or more discontinuities along the circumferential splice surface 106 between the splice surfaces 104 of directly adjacent ones of the splice angles 102 (e.g., as shown in FIGS. 10-12). Such stepping can lead to challenges when installing the pressure bulkhead assembly 100 within the fuselage 1202 of the aircraft 1200. As an example, the initial shape 154 of the circumferential splice surface 106 may not suitably mate with the surface of the skin 1206 of the fuselage 1202. As another example, the splice-to-skin shim (not illustrated), which is positioned between the circumferential splice surface 106 formed by the splice angles 102 and the skin 1206, typically extends across the splice surfaces 104 two or more of the splice angles 102. As such, fabricating the splice-to-skin shim to suitably fill the gap between the splice angles 102 and the skin 1206 can be challenging when such stepping is present.

Referring again to FIG. 4, in one or more examples, the method 1000 includes a step of (block 1020) determining an angular displacement of each one of the splice-angle scans 120 to minimize the step dimension 116 and a step of (block 1022) adjusting (e.g., repositioning) each one of the splice-angle scans 120 by the angular displacement. Adjusting the splice-angle scans 120 by the angular displacement moves the plurality of splice-angle scans 120 from the initial position to an optimized position.

The angular displacement of each one of the splice-angle scans 120 that minimizes the step dimension 116 is used to determine the optimized position of the splice-angle scans 120 and, thus, the optimized position of the splice angles 102 when joined with the aft pressure bulkhead 108 to form the pressure bulkhead assembly 100. In one or more examples, the method 1000 includes a step of (block 1024) determining the optimized position of the plurality of splice angles 102 such that the plurality of splice surfaces 104 of the plurality of splice angles 102 will form the circumferential splice surface 106 with the optimized shape 136 (e.g., as shown in FIGS. 13 and 14). The step of (block 1024) determining the optimized position of the splice angles 102 is achieved by adjusting the splice-angle scans 120 according to the angular displacement between directly adjacent ones of the splice-angle scans 120 to minimize the step dimensions 116.

Accordingly, the optimized position of the splice angles 102 is represented by the optimized position of the splice-angle scans 120. The optimized position of the splice-angle scans 120 is a position of the splice-angle scans 120 in which the step dimension 116 is minimized. The optimized position of the plurality of splice angles 102 is a position of each one of the splice angles 102 in which the step dimension 116 is minimized and the optimized shape 136 of the circumferential splice surface 106, formed by the splice surfaces 104 of the splice angles 102, is achieved. The optimized shape 136 of the circumferential splice surface 106 is the shape of the circumferential splice surface 106 following position optimization of the splice-angle scans 120 and step minimization between the splice-angle scans 120 (e.g., as shown in FIGS. 13 and 14).

Referring again to FIG. 12, in one or more examples, the angular displacement of the splice-angle scan 120 represents an angle of rotation, applied to the splice-angle scan 120 about a rotation axis 156, required to minimize the step dimensions 116 between the splice-angle scan 120 and the directly adjacent splice-angle scan 120. For example, as illustrated in FIG. 12, the first splice-angle scan 120a is adjusted (e.g., angularly reposition) by applying an axial rotation to the first splice-angle scan 120a about the rotation axis 156, according to the angular displacement, in order to: (1) minimize the step dimension 116 between the first mating-edge scan 160a of the first splice-angle scan 120a and the second mating-edge scan 160b of the second splice-angle scan 120b; and (2) minimize the step dimension 116 between the second mating-edge scan 160*b* of the first splice-angle scan 120*a* and the first mating-edge scan 160*a* of the third splice-angle scan 120*c*.

An axial rotation, about a respective rotation axis 156 and according to a respective angular displacement, is then applied to the each remaining one of the splice-angle scans 120 to minimize the step dimensions 116 between each one of the splice-angle scans 120 and its directly adjacent neighbors. In other words, the angular displacement for each one of the splice-angle scans 120 is determined to "split the difference" between the opposed mating-edge scans 160 of each one of the splice-angle scans 120 and the respective mating-edge scan 160 of the directly adjacent, opposing pair of splice-angle scans 120 (e.g., neighboring splice-angle scans 120).

In one or more examples, the adjusting step (e.g., angular repositioning by axial rotation) of each one of the splice-angle scans 120 is performed sequentially along the circumferential splice surface 106. For example, the second splice-angle scan 120*b* is adjusted (e.g., angularly repositioned) to minimize its step dimensions 116 following adjustment of the first splice-angle scan 120*a*. The splice-angle scan 120 that is directly adjacent to the second splice-angle scan 120*b* and opposite the first splice-angle scan 120*a* is then adjusted (e.g., angularly repositioned) to minimize its step dimensions 116. This process is repeated for each subsequent one of the splice-angle scans 120 along a circular path, corresponding to the circumferential splice surface 106, until the third splice-angle scan 120*c* is adjusted (e.g., angularly repositioned) to minimize its step dimensions 116.

Referring again to FIG. 4, in one or more examples, the method 1000 includes a step of sequentially repeating the step of (block 1018) determining the step dimension 116, the step of (block 1020) determining the angular displacement for each one of the plurality of splice angles 102, and the step of (block 1022) adjusting each one of the splice-angle scans 120 by the angular displacement in an iterative matter until the step dimension 116 between each one of the splice-angle scans 120 and its neighbor (e.g., directly adjacent one of the splice-angle scans 120) is below a predetermined threshold. Repeating the optimization steps, referred to above, for each one of the splice-angle scans 120 in an iterative manner further optimizes the position of each one of the splice-angle scans 120 to achieve a shape for the circumferential splice surface 106 that is closer to circular.

The predetermined threshold can be any suitable predefined value. In one or more examples, the predetermined threshold is a maximum dimension value of the step (e.g., of the step dimension 116) between adjacent ones of the splice-angle scans 120 that is within manufacturing tolerance. In one or more examples, the predetermined threshold is a point beyond which there is no discernable angular displacement that would further minimize the step dimension 116.

Referring now to FIGS. 13 and 14, which schematically illustrate an example of the splice-angle scans 120 arranged adjacent to one another at the optimized positioned following the optimization steps (e.g., block 1018, block 1020 and block 1022). With the splice-angle scans 120 at the optimized position, the mating-edge scans 160 of each one of the splice-angle scans 120 abut the mating-edge scan 160 of a directly adjacent one of the splice-angle scans 120. The splice-surface scans 158 representing the splice surfaces 104 of the splice-angle scans 120 form a virtual representation of the circumferential splice surface 106 having the optimized shape 136.

With the splice-angle scans 120 at the optimized position, the stepping between the splice-surface scan 158 of adjacent ones of the splice-angle scans 120 is minimized. As such, when the splice angles 102 are joined with the aft pressure bulkhead 108 at the optimized position, such minimized stepping will reduce, or eliminate, discontinuities along the circumferential splice surface 106 between the splice surfaces 104 of directly adjacent ones of the splice angles 102 (e.g., as shown in FIGS. 13 and 14). Minimizing such stepping is advantageous when installing the pressure bulkhead assembly 100 within the fuselage 1202 of the aircraft 1200. As an example, the optimized shape 136 of the circumferential splice surface 106 will more suitably mate with the surface of the skin 1206 of the fuselage 1202. As another example, the splice-to-skin shim (not illustrated), which is positioned between the circumferential splice surface 106 formed by the splice angles 102 and the skin 1206, typically extends across the splice surfaces 104 two or more of the splice angles 102. As such, fabricating the splice-to-skin shim to suitably fill the gap between the splice angles 102 and the skin 1206 is less challenging when such stepping is minimized.

Figure 15:
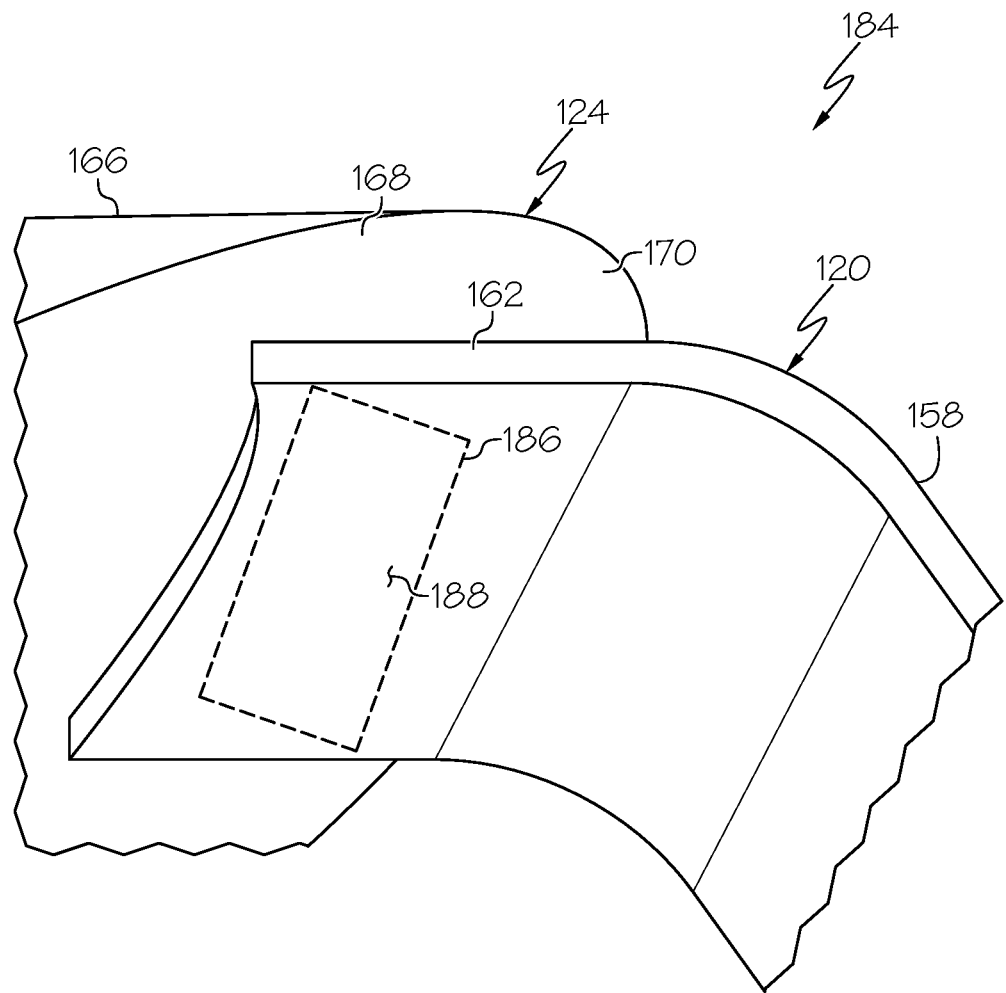
FIG. 15 is a schematic illustration of an example of a three-dimensional virtual overlay of an aft-pressure-bulkhead scan and one of the plurality of splice-angle scans.

Referring again to FIG. 4, in one or more examples, the method 1000 includes a step of (block 1026) performing a virtual fit between the plurality of splice angles 102, at the optimized position, and the aft pressure bulkhead 108. The virtual fit is essentially a virtual joining of the splice angles 102 and the aft pressure bulkhead 108 using the splice-angle scans 120 and an aft-pressure-bulkhead scan 124 (e.g., as shown in FIG. 15). For example, the step of (block 1026) performing the virtual fit includes a step of virtually overlaying, or aligning, the aft-pressure-bulkhead scan 124 with the splice-angle scans 120.

In one or more examples, the method 1000 includes a step of virtually arranging the splice-angle scans 120 in the optimized position (e.g., as shown in FIGS. 13 and 14) before performing the virtual fit (block 1026).

In one or more examples, the method 1000 includes a step of (block 1028) generating the aft-pressure-bulkhead scan 124 (e.g., as shown in FIG. 15) representing the aft pressure bulkhead 108. In one or more examples, the aft-pressure-bulkhead scan 124 is generated using the 3D measurement data obtained during the measuring step (e.g., block 1008). Accordingly, the aft-pressure-bulkhead scan 124 is a virtual model or 3D digital representation of the aft pressure bulkhead 108, such as of the surface (e.g., a 3D surface profile) of the aft pressure bulkhead 108 and, optionally, other geometric features of the aft pressure bulkhead 108.

For example, the aft-pressure-bulkhead scan 124 represents at least a portion of the first bulkhead surface 138 (FIG. 8) and at least a portion of the second bulkhead surface 140 (FIG. 9) of the aft pressure bulkhead 108. In one or more examples, the aft-pressure-bulkhead scan 124 includes a first bulkhead-surface scan 166 (e.g., as shown in FIG. 15) representing the first bulkhead surface 138. In one or more examples, the aft-pressure-bulkhead scan 124 includes a second bulkhead-surface scan 168 (e.g., as shown in FIG. 15) representing the second bulkhead surface 140. In one or more examples, the aft-pressure-bulkhead scan 124 includes a bulkhead-interface-surface scan 170 (e.g., as shown in FIG. 15) representing the bulkhead interface surface 126 (FIG. 9). In one or more examples, the bulkhead-interface-surface scan 170 forms a portion of the second bulkhead-surface scan 168. In one or more examples, the aft-pressure-bulkhead scan 124 includes aft-pressure-bulkhead-hole scans (e.g., not shown) representing the aft-pressure-bulkhead holes 114 (FIGS. 8 and 9) of the aft pressure bulkhead 108.

In one or more examples, the method 1000 includes a step of (block 1030) aligning the aft-pressure-bulkhead scan 124 to the nominal model 122 to virtual fit (e.g., block 1026) the aft pressure bulkhead 108 to the splice angles 102, at the optimized position. For example, aligning the aft-pressure-bulkhead scan 124 to the nominal model 122 virtually overlays the aft-pressure-bulkhead scan 124 to the splice-angle scans 120, which have been position-optimized relative to the nominal model 122.

In one or more examples, according to the method 1000, the step of (block 1030) aligning the aft-pressure-bulkhead scan 124 to the nominal model 122 includes a step of performing a best fit between the aft-pressure-bulkhead scan 124 and the nominal model 122. For example, alignment parameters are calculated by performing an optimized best fit of multiple points of the second bulkhead-surface scan 168 to a portion of the nominal model 122 representing the second bulkhead surface 140 of the pressure bulkhead assembly 100.

In one or more examples, the method 1000 includes a step of (block 1032) determining the splice-angle-hole positions 110 of the splice-angle holes 112 to be drilled in each one of the splice angles 102 such that the splice-angle holes 112 (e.g., as shown in FIG. 16) will correspond to aft-pressure-bulkhead holes 114, pre-drilled in the aft pressure bulkhead 108 (e.g., as shown in FIGS. 8 and 9). The splice-angle-hole positions 110 represent the determined locations and orientations of the splice-angle holes 112, to be drilled in each one of the splice angles 102, such that the that the splice-angle holes 112 will axially align with corresponding aft-pressure-bulkhead holes 114 when the splice angles 102 are joined to the aft pressure bulkhead 108 at the optimized position. Alignment of the splice-angle holes 112 and the aft-pressure-bulkhead holes 114 inherently index the splice angles 102 at the optimized position relative to the aft pressure bulkhead 108.

The splice-angle-hole positions 110 of splice-angle holes 112 are determined based on the measured 3D surface profile of the flange surface 130 of the splice angle 102, the measured 3D surface profile of the bulkhead interface surface 126, and the measured positions of the aft-pressure-bulkhead holes 114. In one or more examples, the step of (block 1032) determining the splice-angle-hole positions 110 of the splice-angle holes 112 includes a step of determining location and orientation of a drilling axis, for drilling each one of the splice-angle holes 112 in the splice angle 102, relative to the 3D profile the flange surface 130 such that the drilling axis is coaxially aligned with a center bore axis of a corresponding one of the aft-pressure-bulkhead holes 114.

In one or more examples, the 3D surface profile of the flange surface 130 (FIG. 8) of the splice angle 102, which is to be joined to the bulkhead interface surface 126 (FIG. 9) of the aft pressure bulkhead 108, is determined by measuring the splice angle 102 (e.g., block 1010), such as measuring the flange surface 130, and is represented by the flange-surface scan 162 of the splice-angle scan 120 (e.g., as shown in FIG. 15). As described above, the splice angles 102 are initially fabricated without full-size pre-drilled holes (e.g., without the plurality of splice-angle holes 112), as illustrated by example in FIGS. 8 and 9.

In one or more examples, the 3D surface profile of the bulkhead interface surface 126 (FIG. 9) of the aft pressure bulkhead 108, which is to be joined to the flange surfaces 130 (FIG. 8) of the splice angles 102, is determined by measuring the aft pressure bulkhead 108 (e.g., block 1008), such as measuring the bulkhead interface surface 126 (e.g., the second bulkhead surface 140), and is represented by the bulkhead-interface-surface scan 170 of the aft-pressure-bulkhead scan 124 (e.g., as shown in FIG. 15). As described above, the aft pressure bulkhead 108 is initially fabricated with full-size pre-drilled holes (e.g., with the plurality of aft-pressure-bulkhead holes 114), as illustrated by example in FIGS. 8 and 9.

In one or more examples, the method 1000 includes a step of (block 1034) determining the aft-pressure-bulkhead-hole positions 132 of the aft-pressure-bulkhead holes 114. In one or more examples, the aft-pressure-bulkhead-hole positions 132 of the aft-pressure-bulkhead holes 114 are determined by measuring the aft pressure bulkhead 108 (e.g., block 1008), such as measuring the bulkhead interface surface 126 and the aft-pressure-bulkhead holes 114. In one or more examples, the step of (block 1034) determining the aft-pressure-bulkhead-hole positions 132 of the aft-pressure-bulkhead holes 114 includes a step of determining the locations and the orientations of the aft-pressure-bulkhead holes 114.

Referring now to FIGS. 6 and 7, in one or more examples, the location of each one of the aft-pressure-bulkhead holes 114 is determined from a first measured location 178 of a first hole-center 172 (e.g., as shown in FIG. 6) of the aft-pressure-bulkhead hole 114 formed in the first bulkhead surface 138 and from a second measured location 180 of a second hole-center 174 (e.g., as shown in FIG. 7) of the aft-pressure-bulkhead hole 114 formed in the second bulkhead surface 140. For example, the first hole-center 172 and the second hole-center 174 are measured (e.g., block 1008) relative to an origin O in an example three-dimensional Cartesian coordinate system XYZ. As an example, the first measured location 178 of the first hole-center 172 of the aft-pressure-bulkhead hole 114 is measured as x1, y1, z1 in the XYZ coordinate system (e.g., as shown in FIG. 6) and the second measured location 180 of the second hole-center 174 of the aft-pressure-bulkhead hole 114 is measured as x2, y2, z2 in the XYZ coordinate system (e.g., as shown in FIG. 7).

It can be appreciated that the origin O (e.g., as shown in FIGS. 6 and 7) may be chosen for convenience, such as at an outer peripheral edge of the aft pressure bulkhead 108. In other instances, the origin O may be chosen at a different location or in other instances, the measurement is made using a different coordinate system, such as a polar or spherical coordinate system, without departing from the scope of the present disclosure.

In one or more examples, the orientation of each one of the aft-pressure-bulkhead holes 114 is determined from the first measured location 178 of the first hole-center 172 and from the second measured location 180 of the second hole-center 174 of the aft-pressure-bulkhead hole 114. Based on the first measured location 178 of the first hole-center 172 and the second measured location 180 of the second hole-center 174, a measured orientation 182 of the aft-pressure-bulkhead hole 114 is determined by the angle θ formed between a plane 176, containing a center bore axis extending between the first hole-center 172 and the second hole-center 174 through the thickness 142 of the aft pressure bulkhead 108 (e.g., as shown in FIG. 6), and a reference plane of the XYZ coordinate system (e.g., XY-plane).

In one or more examples, the step of (block 1032) determining the splice-angle hole positions 110 of the splice-angle holes 112 is performed after the step of (block 1026)

performing the virtual fit by overlaying the aft-pressure-bulkhead scan 124 to the splice-angle scans 120 at the optimized position. For example, the splice-angle scans 120 are arranged adjacent to one another and fixed at the optimized position such that the splice-surface scans 158 form a virtual representation of the circumferential splice surface 106 having the optimized shape 136. The aft-pressure-bulkhead scan 124 can be translated and/or rotated relative to the splice-angle scans 120 to optimize the mating interface between the bulkhead-interface-surface scan 170 and the flange-surface scans 162. A virtual overlay 184 (e.g., a portion of which is shown in FIG. 15) of the aft-pressure-bulkhead scan 124 and the splice-angle scans 120 is fixed and the splice-angle-hole positions 110 are determined (e.g., computed) based on the determined aft-pressure-bulkhead-hole positions 132 of the aft-pressure-bulkhead holes 114.

Referring again to FIG. 4, in one or more examples, the method 1000 includes a step of (block 1034) drilling the splice-angle holes 112 in each one of the splice angles 102 at the splice-angle-hole positions 110.

Referring now to FIG. 16, which schematically illustrates an example of the splice angle 102 after the splice-angle holes 112 are drilled through the flange 148. Each one of the splice-angle holes 112 is drilled at a corresponding splice-angle-hole position 110 (e.g., indicated by x3, y3, z3 in FIG. 16), as determined in accordance with the method 1000.

In one or more examples, as illustrated in FIG. 16, additional splice-angle holes are drilled through the skin splice 150 at appropriate locations for joining the skin splice 150 to the skin 1206 of the fuselage 1202 when installing the pressure bulkhead assembly 100 within the fuselage 1202 (e.g., as shown in FIG. 3). In one or more examples, the additional splice-angle holes are full size holes drilled through the skin splice 150 at the pilot holes 152 (FIGS. 8 and 9).

In one or more examples, the method 1000 includes a step of (block 1036) assembling the pressure bulkhead assembly 100. In one or more examples, according to the method 1000, the step of (block 1036) assembling the pressure bulkhead assembly 100 includes a step of (block 1038) joining each one of the splice angles 102 with the aft pressure bulkhead 108 such that the splice surfaces 104 of the splice angles 102 form the circumferential splice surface 106 of the pressure bulkhead assembly 100 with the optimized shape 136 (e.g., as shown in FIG. 1).

Referring now to FIG. 17, which schematically illustrates an example of a portion of the pressure bulkhead assembly 100. In one or more examples, when assembling the pressure bulkhead assembly 100, a gap can exist between the bulkhead interface surface 126 of the aft pressure bulkhead 108 and the flange surface 130 of one or more of the splice angles 102. It can be appreciated that such gaps may be formed due to manufacturing tolerances for the aft pressure bulkhead 108 and the splice angles 102. The shim 128 is used to fill the gap between the bulkhead interface surface 126 and the flange surface 130.

Referring again to FIG. 4, in one or more examples, the method 1000 includes a step of (block 1040) determining shim dimensions of the shim 128 to be positioned between the bulkhead interface surface 126 of the aft pressure bulkhead 108 and the flange surface 130 of one of the splice angles 102.

In one or more examples, the shim dimensions of the shim 128 are determined based on gaps identified in the virtual overlay 184 (FIG. 15) between the bulkhead-interface-surface scan 170 and the flange-surface scan 162. In one or more examples, the method 1000 includes a step of determining (e.g., detecting or estimating) the gaps between the bulkhead-interface-surface scan 170 and the flange-surface scan 162, which would correspond to a gap formed between the bulkhead interface surface 126 of the aft pressure bulkhead 108 and the flange surface 130 of the splice angles 102 when assembling the pressure bulkhead assembly 100.

Referring to FIG. 15, which schematically illustrates an example of a portion of the virtual overlay 184 between the aft-pressure-bulkhead scan 124 and the splice-angle scans 120 (only one splice-angle scan 120 is shown in FIG. 15 for the purpose of clarity). In one or more examples, when the aft-pressure-bulkhead scan 124 and the splice-angle scans 120 are virtually overlaid, any deviations between the bulkhead-interface-surface scan 170 and the flange-surface scan 162 are identified as gaps. Computed deviations that exceed design allowances are identified as gaps that need to be filled by the shim 128 (e.g., as shown in FIG. 16) and are used to determine the shim dimensions.

In one or more examples, the deviations are used to determine a shim outline 186 and a 3D shim-surface profile 188 of the shim 128 to be used to fill the gap between the bulkhead interface surface 126 and the flange surface 130. The shim outline 186 and the shim-surface profile 188 represent the shim dimensions.

Referring again to FIG. 4, in one or more examples, the method 1000 includes a step of (block 1042) fabricating (e.g., making) the shim 128, used to fill the gap between the aft pressure bulkhead 108 and the splice angles 102, based on the shim dimensions. The shim outline 186 and the shim-surface profile 188 (e.g., as shown in FIG. 15) of the shim 128 are determined based on dimensional data of the deviations between the bulkhead-interface-surface scan 170 and the flange-surface scan 162. The shim outline 186 and shim-surface profile 188 represent the length, width, thickness and surface geometry of the shim 128.

In one or more examples, the step of (block 1042) fabricating the shim 128 includes machining the shim 128 to have the determined shim dimensions (e.g., to form the shim outline 186 and the shim-surface profile 188) from a stock shim (not shown). The shim 128 is machined according to the shim dimensions to fill the gap between the aft pressure bulkhead 108 and the splice angles 102 (e.g., as shown in FIG. 17).

In one or more examples, the method 1000 includes a step of determining a plurality of shim-hole positions 192 of a plurality of shim holes 190 (e.g., as shown in FIG. 18) to be drilled in each one of the shims 128. In one or more examples, the shim-hole positions 192 of the shim holes 190 are determined based on the virtual overlay 184 (FIG. 15) and the determined the shim dimensions. For example, with the virtual overlay 184 of the aft-pressure-bulkhead scan 124 and the splice-angle scans 120 fixed, the shim-hole positions 192 are determined (e.g., computed) based on the determined aft-pressure-bulkhead-hole positions 132 of the aft-pressure-bulkhead holes 114 and the splice-angle-hole positions 110 of the splice-angle holes 112.

In one or more examples, the step of (block 1042) fabricating the shim 128 includes a step of drilling the shim holes 190 through the shim 128 at the determined shim-hole positions 192. Each one of the shim holes 190 is drilled at a corresponding shim-hole position 192 (e.g., indicated by x4, y4 in FIG. 18).

In one or more examples, the shim holes 190 are drilled in the shim 128 before the shim 128 is machined to the shim dimensions. For example, the shim holes 190 are drilled in the stock shim having an approximately flat configuration (e.g., a flat stock shim). In these examples, the shim-surface profile 188 is transformed to a virtual (e.g., flat or planar) profile corresponding to the flat surface of the stock shim and the shim-hole positions 192 are transformed to corresponding virtual positions on the stock shim. The shim holes 190 are drilled in the stock shim at the virtual positions such that the shim holes 190 are at appropriate shim-hole positions 192 after machining the stock shim to the shim dimensions.

In one or more examples, the shim holes 190 are drilled in the shim 128 after the shim 128 is machined to the shim dimensions. In these examples, the shim holes 190 are drilled in the shim 128 at the determined shim-hole positions 192.

Referring now to FIG. 18, which schematically illustrates an example of the shim 128. The shim-hole positions 192 of the shim holes 190 correspond to the aft-pressure-bulkhead-hole positions 132 of the aft-pressure-bulkhead holes 114 in the aft pressure bulkhead 108 and the splice-angle-hole positions 110 of the splice-angle holes 112 in the splice angle 102. The shim holes 190 will axially align with corresponding aft-pressure-bulkhead holes 114 and corresponding splice-angle holes 112 when the shim 128 is positioned between the bulkhead interface surface 126 and the flange surface 130 and the splice angle 102 is joined to the aft pressure bulkhead 108 at the optimized position (e.g., as shown in FIG. 17). Filling the gap between the aft pressure bulkhead 108 and the flange 148 with the shim 128 maintains the splice angle 102 at the optimized position relative to the aft pressure bulkhead 108.

Referring again to FIG. 4, in one or more examples, according to the method 1000, the step of (block 1036) includes a step of (block 1044) positioning the shim 128 between the bulkhead interface surface 126 and the flange surface 130 before the step of (1038) joining the splice angle 102 with the aft pressure bulkhead 108 such that shim holes 190 axially align with corresponding aft-pressure-bulkhead holes 114 and corresponding splice-angle holes 112.

In one or more examples, the method 1000 includes a step of (block 1046) moving the aft-pressure-bulkhead scan 124 relative to the plurality of splice-angle scans 120 such that the shim dimensions of the shim 128 are greater than minimum manufacturing dimensions. In one or more examples, when the aft-pressure-bulkhead scan 124 and the splice-angle scans 120 are virtually overlaid, the computed deviations between the bulkhead-interface-surface scan 170 and the flange-surface scan 162 exceed design allowances but define a gap that is less than the minimum manufacturing dimensions for the shim 128. In one or more examples, after the step of (block 1026) performing the virtual fit, the aft-pressure-bulkhead scan 124 is moved away from the splice-angle scans 120, along an axis that is circumscribed by the circumferential splice surface 106, to space the bulkhead-interface-surface scan 170 away from the flange-surface scans 162 until the shim dimensions of the shim 128 are greater than minimum manufacturing dimensions of the shim 128. In these examples, the splice-angle-hole positions 110, the shim-hole positions 192, and the shim dimensions are determined after the aft-pressure-bulkhead scan 124 is moved (e.g., spaced) away from the splice-angle scans 120.

Referring to FIGS. 1 and 17, in one or more example, after the splice-angle holes 112 are drilled in the splice angles 102, each one of the splice angles 102 is joined to the aft pressure bulkhead 108 such that the splice-angle holes 112 are aligned with corresponding ones of the aft-pressure-bulkhead holes 114. Fasteners 134 (FIG. 17) are installed through the aligned aft-pressure-bulkhead holes 114 in the aft pressure bulkhead 108 and splice-angle holes 112 in the splice angles 102 to secure the splice angle 102 to the aft pressure bulkhead 108 at the optimized position. Drilling the splice-angle holes 112 at the splice-angle-hole positions 110, as described herein, enables the fasteners 134 to index the splice angle 102 at the optimized position. Assembly of the pressure bulkhead assembly 100 in accordance with the method 1000 also reduces, or eliminates, the amount of assembly tooling required to index and hold the splice angles 102 in position relative to the aft pressure bulkhead 108 when assembling the pressure bulkhead assembly 100, which advantageously improves cycle time and reduces manufacturing costs.

In one or more examples, shims 128 are used, as needed, to fill the gaps between the bulkhead interface surface 126 and the flange surface 130. After the shim 128 is machined to the shim dimensions and the shim holes 190 are drilled in the shim 128, the splice angle 102 and the shim 128 are joined to the aft pressure bulkhead 108 such that the shim holes 190 and the splice-angle holes 112 are aligned with corresponding ones of the aft-pressure-bulkhead holes 114 in the aft pressure bulkhead 108. The fasteners 134 (FIG. 17) are installed through the aligned aft-pressure-bulkhead holes 114 in the aft pressure bulkhead 108, the shim holes 190 in the shim 128, and splice-angle holes 112 in the splice angle 102 to secure the splice angle 102 and the shim 128 to the aft pressure bulkhead 108 with the splice angle 102 at the optimized position.

Each one of the splice angles 102 is joined to the aft pressure bulkhead 108 at the optimized position, as expressed above, so that the flange surface 130 mates with a corresponding portion (e.g., section) of the bulkhead interface surface 126 to form the circumferential splice surface 106 of the pressure bulkhead assembly 100 with the optimized shape 136 (FIG. 1). The shims 128 are used as needed to fill gaps between the flange surface 130 and the bulkhead interface surface 126. The fasteners 134 are sent through the aligned set of holes to join the aft pressure bulkhead 108 and the splice angles 102 and the shims 128, as needed, together to form the pressure bulkhead assembly 100. The fasteners 134 may take any desirable form, such as permanent fasteners.

The fasteners 134 and the shims 128 maintain the optimized shape 136 when the splice angles 102 are joined to the aft pressure bulkhead 108. The pressure bulkhead assembly 100 may include any number of splice angles 102 needed to form the circumferential splice surface 106 and for attachment of the pressure bulkhead assembly 100 the fuselage 1202. In an example, thirty-two splice angles 102 are coupled to the aft pressure bulkhead 108 to form the pressure bulkhead assembly 100.

Referring now to FIG. 5, which schematically illustrates an example of the system 200. In one or more examples, the system 200 is configured to make accurate measurements of the aft pressure bulkhead 108 and the splice angles 102 and to process those measurements, for example, to generate the aft-pressure-bulkhead scan 124 and the splice-angle scans 120. The system 200 is also configured to determine the optimal position of the splice angles 102 from the measurements of the aft pressure bulkhead 108 and the splice angles 102. The system 200 is further configured to determine the splice-angle-hole positions 110 of the splice-angle holes 112 such that the optimal position of the splice angles 102 is maintained when the splice angles 102 are joined with the aft pressure bulkhead 108. The system 200 is additionally configured to machine the splice angles 102 (e.g., drill the splice-angle holes 112 in the splice angles 102). The system

200 is further configured to machine the shims 128 that comply with required tolerances, as needed.

In one or more examples, the system 200 includes a measurement machine 202 configured to take measurements of the aft pressure bulkhead 108 and the plurality of splice angles 102. In one or more examples, the measurement machine 202 is a Coordinate Measurement Machine (CMM).

In one or more examples, the measurement machine 202 (e.g., CMM) is configured to measure an object in a three-dimensional (3D) coordinate system, often in comparison to a computer aided design (CAD) model of the object. For example, the measurement machine 202 makes measurements of the aft pressure bulkhead 108 and of the splice angles 102 for drilling the splice-angle holes 112 in the splice angles 102 and, optionally, adding the shims 128 and drilling the shim holes 190 in the shims 128 as necessary to fill the gaps between the aft pressure bulkhead 108 and the splice angles 102.

The measurement machine 202 is any suitable metrological machine. In one or more examples, the measurement machine 202 is a Portable Coordinate Measuring machine. In one or more examples, the measurement machine 202 includes an articulated measurement arm, such as a ROMER arm machine (e.g., not shown). For example, the measurement machine 202 includes a robotic arm that operates in 3D space with six or seven joints, having six degrees of freedom, which means that the robotic arm can move in three-dimensional space forward/backward, up/down, left/right combined with rotation about three perpendicular axes (roll, yaw, pitch). The movement along each of the three axes is independent of each other and independent of the rotation about any of these axes, having the six degrees of freedom.

In one or more examples, the measurement machine 202 is configured to take measurements of selected areas on the aft pressure bulkhead 108 (e.g., the aft-pressure-bulkhead holes 114 and the bulkhead interface surface 126). In one or more examples, the measurement machine 202 is positioned adjacent to the aft pressure bulkhead 108 to be measured, such that the articulated measurement arm can take measurements of the location and orientation of the aft-pressure-bulkhead holes 114 and the bulkhead interface surface 126. In one or more examples, the aft pressure bulkhead 108 is mounted on an assembly jig or support tooling for taking measurements by the measurement machine 202.

In one or more examples, the measurement machine 202 is configured to take measurements of selected areas on the splice angles 102 (e.g., the flange surface 130 and the splice surface 104). In one or more examples, the measurement machine 202 is positioned adjacent to the splice angles 102 to be measured, such that the articulated measurement arm can take measurements of the flange surface 130 and the splice surface 104. In one or more examples, one or more of the splice angles 102 may mounted on an assembly jig or support tooling for taking measurements of each one of the splice angles 102 by the measurement machine 202.

It should be appreciated that other suitable types of coordinate measurement machines with sufficient accuracy may be used to take measurements of the selected areas of the structure being measured (e.g., aft pressure bulkhead 108 and splice angles 102), such as a handheld measuring device or a laser scanner. Further, it should be appreciated that the system 200 may use different coordinate measurement machines to take measurements of the aft pressure bulkhead 108 and the splice angles 102.

In one or more examples, the system 200 includes a computer system 204. In one or more examples, the system 200 includes a measurement apparatus 220. In one or more examples, the measurement apparatus 220 includes, or takes the form of, a spatial relation apparatus. The measurement apparatus 220 includes the measurement machine 202 and the computer system 204 (e.g., a controller). The measurements taken by the measurement machine 202 are sent to the computer system 204. The computer system 204 provides the interface for a user to execute a measurement plan, processes the measurements taken by the measurement machine 202, and provides the processed measurements in an .XML format to an on demand emergent manufacturing (ODEM) application 222.

The computer system 204 includes a processor 210 and memory 206. The memory 206 stores one or more programs 208. In one or more examples, the computer system 204 includes a measurement software platform. The measurement software platform is any suitable type that includes programs 208 adapted to take and process measurements. One exemplary measurement software platform (e.g., program 208) is a spatial analyzer program 224. In one or more examples, the computer system 204 includes an optimization software platform. The optimization software platform is any suitable type that includes programs 208 adapted to process measurement data and execute optimization algorithms on the data. One exemplary optimization software platform (e.g., program 208) is a best-fit optimizer program 226.

In one or more examples, the processor 210 is configured to execute the program 208 to determine the optimized position of the plurality of splice angles 102 such that the plurality of splice surfaces 104 of the plurality of splice angles 102 will form the circumferential splice surface 106 with the optimized shape 136. The processor 210 is configured to execute the program 208 to perform the virtual fit between the plurality of splice angles 102, at the optimized position, and an aft pressure bulkhead 108. The processor 210 is configured to execute the program 208 to determine the splice-angle-hole positions 110 of splice-angle holes 112 to be drilled in each one of the plurality of splice angles 102 such that the splice-angle holes 112 will correspond to aft-pressure-bulkhead holes 114, pre-drilled in the aft pressure bulkhead 108.

In one or more examples, the processor 210 is configured to execute the program 208 to generate the plurality of splice-angle scans 120 representing the plurality of splice surfaces 104 from measurements of the plurality of splice angles 102, taken by the measurement machine 202. The processor 210 is configured to execute the program 208 to align the plurality of splice-angle scans 120 to the nominal model 122 representing the pressure bulkhead assembly 100 to arrange the plurality of splice-angle scans 120 at the initial position in which the plurality of splice-surface scans 158 of the plurality of splice-angle scans 120 represents the circumferential splice surface 106 with the initial shape 154.

In one or more examples, the processor 210 is configured to execute the program 208 to determine the step dimension 116 between the mating-edge scan 160 of each one of the plurality of splice-angle scans 120 and the mating-edge scan 160 of a directly adjacent one of the plurality of splice-angle scans 120. The processor 210 is configured to execute the program 208 to determine the angular displacement of each one of the splice-angle scans 120 to minimize the step dimension 116. The processor 210 is configured to execute the program 208 to adjust each one of the plurality of splice-angle scans 120 by the angular displacement to move the plurality of splice-angle scans 120 to the optimized position.

In one or more examples, the processor 210 is configured to execute the program 208 to virtually arrange the plurality of splice-angle scans 120 in the optimized position before performing the virtual fit. The processor 210 is configured to execute the program 208 to generate the aft-pressure-bulkhead scan 124 representing the bulkhead interface surface 126 of the aft pressure bulkhead 108 from measurements of the aft pressure bulkhead 108, taken by the measurement machine 202. The processor 210 is configured to execute the program 208 to align the aft-pressure-bulkhead scan 124 to the nominal model 122 to virtually overlay the aft-pressure-bulkhead scan 124 to the plurality of splice-angle scans 120, at the optimized position.

In one or more examples, the system 200 includes a Computer Numerically Controlled (CNC) machine 212, or equivalent. The CNC machine 212 is configured to drill the splice-angle holes 112 (e.g., FIG. 16) in each one of the plurality of splice angles 102 at the splice-angle-hole positions 110. For example, each one the splice angles 102 is secured and indexed on a drill fixture.

In one or more examples, the computer system 204 executes a software application to create a program to drill the splice-angle holes 112 in the splice angles 102 based on the determined splice-angle-hole positions 110 that align with the measured aft-pressure-bulkhead-hole positions 132 of the aft-pressure-bulkhead holes 114 in the aft pressure bulkhead 108. In one or more examples, the CNC machine 212 drills the splice-angle holes 112 in the splice angles 102 based on the created program. In one or more examples, the CNC machine 212 drills the splice-angle holes 112 in each one the splice angles 102 based on the NC programs 228.

In one or more examples, the CNC machine 212 includes a network computer (NC) controller 232 that receives the NC program 228. The system 200 takes measurements, processes the measurements in accordance with the requirement document in an .XML format. The ODEM application 222 then updates the NC seed model with the .XML formatted data, and then automatically creates the requisite validated NC program 230.

In one or more examples, the system 200 includes an assembly jig 214 configured to restrain the aft pressure bulkhead 108 for joining each one of the plurality of splice angles 102 with the aft pressure bulkhead 108 such that the plurality of splice surfaces 104 forms the circumferential splice surface 106 with the optimized shape 136.

In one or more examples, the processor 210 executes the program 208 (e.g., the spatial analyzer program 224) to facilitate the measurement apparatus 220 in providing an interface for a user to execute the measurement plan, process the measurements, and provide the processed measurements, as described in the method 1000, to the ODEM application 222. In one or more examples, the processor 210 executes the program 208 (e.g., the spatial analyzer program 224) to direct the measurement machine 202 to execute operational measuring steps (e.g., block 1008 and block 1010) of the method 1000.

In one or more examples, the processor 210 executes the spatial analyzer program 224 to perform an operational step of implementing a first measurement model (e.g., 3D seed model) of the aft pressure bulkhead 108 that includes a plurality of first measurement points for each one of the aft-pressure-bulkhead holes 114 and for portions of the bulkhead interface surface 126, adjacent to the aft-pressure-bulkhead holes 114, and a second measurement model (e.g., 3D seed model) for each one of the splice angles 102 that includes a plurality of second measurement points for portions of the flange surface 130. The processor 210 then executes the spatial analyzer program 224 to perform further operational steps (e.g., blocks 1012-1020, 1026-1032 and 1040) of method 1000.

In one or more examples, the first hole-center 172 of each one of the aft-pressure-bulkhead holes 114 (FIG. 6) along the first bulkhead surface 138 of the aft pressure bulkhead 108 is measured (e.g., block 1008) by the measurement machine 202, relative to an origin O in an example three-dimensional Cartesian coordinate system XYZ. The second hole-center 174 of each one of the aft-pressure-bulkhead holes 114 (FIG. 7) along the second bulkhead surface 140 of the aft pressure bulkhead 108 is measured (e.g., block 1006) by the measurement machine 202 relative to the origin O in the example three-dimensional Cartesian coordinate system XYZ.

In one or more examples, the computer system 204 processes the measurements to determine the aft-pressure-bulkhead-hole position 132 (e.g., relative location and orientation) for the aft-pressure-bulkhead hole 114. In one or more examples, the computer system 204 processes the measurements to determine the aft-pressure-bulkhead-hole position 132 for each one of the aft-pressure-bulkhead holes 114 in the aft pressure bulkhead 108.

In one or more examples, the bulkhead interface surface 126 of the aft pressure bulkhead 108 is scanned by the measurement machine 202. A three-dimensional (3D) scan of aft pressure bulkhead 108 (e.g., the aft-pressure-bulkhead scan 124) is generated and stored by the computer system 204. In one or more examples, the 3D scan produces 3D point cloud surface profile data for the aft pressure bulkhead 108.

In one or more examples, the 3D scan of the aft pressure bulkhead 108 is compared to a corresponding the 3D seed model, to a nominal model of the aft pressure bulkhead 108, or to as-designed dimensions derived from drawings associated with the aft pressure bulkhead 108 to identify the measurement capability of the measurement machine 202 performing the 3D scan, to ensure that the measurement process resulted in no errors, to ensure proper alignment has been achieved and/or to confirm no anomalies are present.

In one or more examples, the flange surface 130 and the splice surface 104 of the splice angle 102 is scanned by the measurement machine 202. A three-dimensional (3D) scan of the splice angle 102 (e.g., splice-angle scan 120) is generated and stored by the computer system 204. In one or more examples, the 3D scan produces 3D point cloud surface profile data for the splice angle 102.

In one or more examples, the 3D scan of the splice angle 102 is compared to a corresponding the 3D seed model, to a nominal model of the splice angle 102, or to as-designed dimensions derived from drawings associated with the splice angles 102 to identify the measurement capability of the measurement machine 202 performing the 3D scan, to ensure that the measurement process resulted in no errors, to ensure proper alignment has been achieved and/or to confirm no anomalies are present.

In one or more examples, the computer system 204 executes a software application (e.g., the spatial analyzer program 224) to generate the aft-pressure-bulkhead scan 124 and the splice-angle scans 120. For example, the aft-pressure-bulkhead scan 124 is generated using the 3D scan (e.g., measurement data and/or 3D cloud surface profile data) of the aft-pressure-bulkhead-hole positions 132 of the aft-pressure-bulkhead holes 114, the first bulkhead surface 138, the second bulkhead surface 140, and the bulkhead interface surface 126. The splice-angle scans 120 are generated using the 3D scan (e.g., measurement data and/or 3D cloud surface profile data) of the first splice-angle surface 144 and the second splice-angle surface 146.

In one or more examples, the processor 210 executes the program 208 (e.g., the best-fit optimizer program 226) to process the measurements of the step dimension 116 and the angular displace and facilitate optimization of the circumferential splice surface 106, as described in the method 1000. In one or more examples, the processor 210 executes the program 208 (e.g., the best-fit optimizer program 226) to direct the computer system 204 to execute operational optimizing steps (e.g., blocks 1018-1024) of the method 1000.

In one or more examples, the best-fit optimizer program 226 performs a position optimization operation on each one of the splice-angle scans 120 by rotationally adjusting the angular orientation of each one of the splice-angle scans 120 according to determined angular displacement to minimize the step dimension 116 (e.g., as shown in FIG. 12) and move the splice-angle scans 120 from the initial position (e.g., as shown in FIGS. 10 and 11) to the optimized position (e.g., as shown in FIGS. 13 and 14).

In one or more examples, the spatial analyzer program 224 performs the virtual fitting, for example, generates the virtual overlay 184 (e.g., as shown in FIG. 15), by virtually aligning the aft-pressure-bulkhead scan 124 (representing the bulkhead interface surface 126 of the aft pressure bulkhead 108) with the splice-angle scans 120 (representing the corresponding flange surfaces 130 of the splice angles 102) at the optimized position, for example, relative to the nominal model 122. Based on the virtual overlay 184 of the aft-pressure-bulkhead scan 124 and the splice-angle scans 120 at the optimized position, the spatial analyzer program 224 determines the splice-angle-hole positions 110 of the splice-angle holes 112 to be drilled in each one of the splice angles 102 corresponding to the aft-pressure-bulkhead holes 114 in the aft pressure bulkhead 108.

Accordingly, the splice-angle-hole position 110 of each one of the splice-angle holes 112, determined by the spatial analyzer program 224, provides the location and orientation of a drilling axis for drilling the splice-angle hole 112. During fabrication (e.g., assembly) of the pressure bulkhead assembly 100 (FIG. 1), the splice-angle holes 112 coaxially align with the aft-pressure-bulkhead holes 114 such that the splice angles 102 are indexed at the optimized position.

In one or more examples, the ODEM application 222 generates network computer (NC) programs 228 and then validates the NC programs and generates validated NC programs 230 to enable drilling full-size holes in the splice angles 102, machining or fabricating necessary shims 128, and drilling full-size holes in the shims 128 (e.g., blocks 1034 and 1042) when provided with the compatibly-formatted .XML measurement files and 3D seed models from the spatial analyzer program 224. Each hole to be drilled will have an XYZ point to be drilled and an associated plane, which determines the orientation of the hole to be drilled. Accordingly, the system 200 is configured to generate a plurality of NC programs for drilling the splice-angle holes 112 in the splice angles 102 based on obtained measurements.

In one or more examples, the spatial analyzer program 224 is adapted (e.g., programmed) to link a three-dimensional (3D) measurement seed model. For example, the system 200 includes 3D measurement seed models that correspond to the aft pressure bulkhead 108 and the splice angles 102 in nominal configurations that include the interfacing surfaces, nominal full-size holes, and surface geometry. As an example, for the aft pressure bulkhead 108, the corresponding measurement seed model identifies the first bulkhead surface 138, the second bulkhead surface 140, the bulkhead interface surface 126 and the aft-pressure-bulkhead holes 114 (e.g., as shown in FIGS. 6-9). As an example, for each one of the splice angles 102, the corresponding measurement seed model may identify the flange 148, the skin splice 150, the flange surface 130, and the splice surface 104 (e.g., as shown in FIGS. 8 and 9).

In one or more examples, for each selected area to be measured, the spatial analyzer program 224 operates to lead the measurement machine 202 (e.g., under automated computer control or under operator control) through the measuring and processing steps needed, resulting in a coordinate system transform from an as-mounted CMM coordinate system to a 3D NC seed model in a nominal coordinate system for each one of the aft pressure bulkhead 108 and the splice angles 102.

In one or more examples, the system 200 provides the processed measurements in the .XML format to the ODEM application 222. The ODEM application 222 generates and then validates the network computer program (e.g., NC program 228 or validated NC program 230) for drilling the splice-angle holes 112 (e.g., full-size holes) in the splice angles 102 and, optionally, to fabricate (e.g., machine and drill full-size holes in) the shims 128, as necessary, when provided with the compatibly formatted .XML measurement files and NC seed models. Each hole to be drilled will have an XYZ point to be drilled and an associated plane, which determines the location and orientation of the hole to be drilled. The ODEM application 222 also monitors the fabrication status of the drilled or machined part.

In one or more examples, the ODEM application 222 also transfers the network computer programs to a server that includes setup files that reflect the allowable tolerances of the drilled holes and the shims and the quality assurance provisions per product definition data along with measurement plans, index plans, and installation plans.

In one or more examples, the processor 210 is configured to execute the program 208 to determine shim dimensions of the shim 128 to be positioned between the bulkhead interface surface 126 and the flange surface 130 of one of plurality of splice angles 102. The shim 128 is positioned between the bulkhead interface surface 126 and the flange surface 130 before joining the one of the plurality of splice angles 102 with the aft pressure bulkhead 108.

In one or more examples, when the spatial analyzer program 224 overlays the aft-pressure-bulkhead scan 124 with the splice-angle scans 120, the spatial analyzer program 224 further estimates gaps between the bulkhead-interface-surface scan 170 and the flange-surface scan 162. The estimated gaps are representative of the gaps between the bulkhead interface surface 126 of the aft pressure bulkhead 108 and the flange surface 130 of the splice angles 102. The estimated gaps are used to determine shimming required to fill any gaps between the bulkhead interface surface 126 and the flange surface 130 during assembly of the pressure bulkhead assembly 100.

In one or more examples, the spatial analyzer program 224 minimizes the gaps and, thus, the shimming requirements by adjusting the position of the aft-pressure-bulkhead scan 124 relative to the splice-angle scans 120 during virtual overlaying and alignment, as described above. This gap minimization step is performed before the step of (block 1032) determining the splice-angle-hole positions 110 of the splice-angle holes 112.

In one or more examples, in order to determine the shimming and/or spacing requirement, the spatial analyzer program 224 determines a set of deviations (defining the gaps) between the bulkhead-interface-surface scan 170 and the corresponding flange-surface scan 162 during overlay and compares the set of deviations with design allowances for deviations in design or nominal 3D profiles of the aft pressure bulkhead 108 and the splice angles 102. The set of deviations between the bulkhead-interface-surface scan 170 and the flange-surface scan 162 includes, for example, dimensional and 3D surface profile data. The set of deviations that exceed (e.g., greater than) the design allowances determines mating surfaces and profiles for the shims 128 to be positioned between the aft pressure bulkhead 108 and the splice angles 102.

In one or more examples, the processor 210 is configured to execute the program 208 to move the aft-pressure-bulkhead scan 124 relative to the plurality of splice-angle scans 120 such that the shim dimensions of the shim 128 are greater than minimum manufacturing dimensions. In one or more examples, the spatial analyzer program 224 sizes the dimensions of the gaps and, thus, the shimming requirements such that the shim dimensions meet minimum manufacturing dimensions by adjusting the position of the aft-pressure-bulkhead scan 124 relative to the splice-angle scans 120 during virtual overlaying and alignment. This gap sizing is performed before the determining the splice-angle-hole positions 110 of the splice-angle holes 112.

In one or more examples, the CNC machine 212 is configured to fabricate (e.g., machine) the shim 128 based on the shim dimensions. The CNC machine 212 is configured to drill the shim holes 190 in the shims 128 (e.g., FIG. 18). For example, each one the shims 128 is secured and indexed on a drill fixture.

In one or more examples, the computer system 204 executes a software application to create a program to machine the shim 128, according to the determined shim dimensions, and drill the shim holes 190 in the shim 128, based on the determined shim-hole positions 192 that align with the measured aft-pressure-bulkhead-hole positions 132 of the aft-pressure-bulkhead holes 114 and the determined splice-angle-hole positions 110 of the splice-angle holes 112. In one or more examples, the CNC machine 212 machines the shims 128 and drills the shim holes 190 in the shims 128 based on the created program. In one or more examples, the CNC machine 212 drills the shim holes 190 in each one the shims 128 based on the NC programs 228.

In one or more examples, a set of .XML measurement files is generated incorporating the determinations of the splice-angle-hole positions 110 of the splice-angle holes 112 to be drilled in the splice angles 102, the shim dimensions (e.g., shim outline 186 and shim-surface profile 188) of the shims 128 to be machined, and the determinations of the shim-hole positions 192 of the shim holes 190 to be drilled in the shims 128. In one or more examples, the spatial analyzer program 224 generates the set of .XML files and transmits the set of .XML files to the ODEM application 222. The ODEM application 222 then generates the plurality of NC programs 228 for drilling the splice-angle holes 112 in the splice angles 102, for machining the shims 128 to fill the gaps, and for drilling the shim holes 190 in the shims 128. The NC programs 228 are then validated, and the ODEM application 222 then transfers a set of validated NC programs 230 to the CNC machine 212 or equivalent. The NC controller 232 receives the validated NC programs 230 and the CNC machine 212 drills the splice-angle holes 112 in the splice angles 102, machines the shims 128, and drills the shim holes 190 in the shims 128 based on the set of validated NC programs 230.

Figure 19:
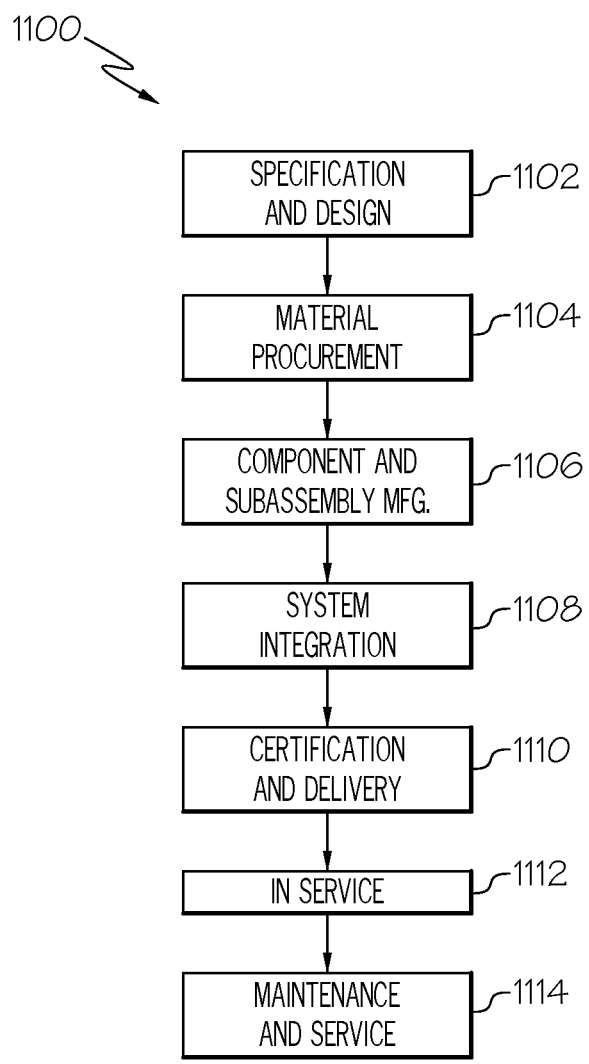
FIG. 19 is a flow diagram of an aircraft manufacturing and service methodology.

Referring now to FIGS. 2 and 19, examples of the method 1000, the system 200 and the pressure bulkhead assembly 100 may be related to, or used in the context of, an aircraft manufacturing and service method 1100, as shown in the flow diagram of FIG. 19 and the aircraft 1200, as schematically illustrated in FIG. 2. For example, the aircraft 1200 and/or the aircraft production and service methodology 1100 may utilize the pressure bulkhead assembly 100 made according to the method 1000 and/or using the system 200 described with respect to FIGS. 1 and 3-18.

Referring to FIG. 2, examples of the aircraft 1200 may include an airframe 1210 that forms the wings 1208 and the fuselage 1202 having the interior 1204. The aircraft 1200 also includes a plurality of high-level systems 1222. Examples of the high-level systems 1222 include one or more of a propulsion system 1224, an electrical system 1226, a hydraulic system 1228, and an environmental system 1230 (e.g., environmental control system). In other examples, the aircraft 1200 may include any number of other types of systems, such as a communications system, a flight control system, a guidance system, a weapons system, and the like.

Referring to FIG. 19, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 19 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the pressure bulkhead assembly 100, the system 200 and the method 1000 shown and described herein may be employed during any one or more of the stages of the manufacturing and service method 1100 shown in the flow diagram illustrated by FIG. 19. In an example, implementations of the pressure bulkhead assembly 100, the system 200 and the method 1000 may form a portion of component and subassembly manufacturing (block 1106) and/or system integration (block 1108). For example, production of the pressure bulkhead assembly 100, made using the system 200 or according to the method 1000, or production of the aircraft 1200 that includes the pressure bulkhead assembly 100 may correspond to component and subassembly manufacturing (block 1106). Further, the pressure bulkhead assembly 100, made using the system 200 or according to the method 1000, may be utilized in a manner similar to components or subassemblies prepared while the aircraft 1200 is in service (block 1112). Also, the pressure bulkhead assembly 100, made using the system 200 or according to the method 1000, may be utilized during system integration (block 1108) and certification and delivery (block 1110). Similarly, implementations of the pressure bulkhead assembly 100, made using the system 200 or according to the method 1000, may be utilized, for example and without limitation, while the aircraft 1200 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to structural component assemblies and systems and methods of making the same for other types of vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-3 and 5-18, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-3 and 5-18, referred to above, need be included in every example and not all elements, features, and/or components described herein are necessarily depicted in each illustrative example. Accordingly, some of the elements, features, and/or components described and illustrated in FIGS. 1-3 and 5-18 may be combined in various ways without the need to include other features described and illustrated in FIGS. 1-3 and 5-18, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-3 and 5-18, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-3 and 5-18, and such elements, features, and/or components may not be discussed in detail herein with reference to each of FIGS. 1-3 and 5-18. Similarly, all elements, features, and/or components may not be labeled in each of FIGS. 1-3 and 5-18, but reference numerals associated therewith may be utilized herein for consistency.

In FIGS. 4 and 19, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 4 and 19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the pressure bulkhead assembly 100, the system 200 and the method 1000 have been shown and described, modifications may occur to those skilled in the art upon reading the specification. The present application includes such modifications and is limited only by the scope of the claims.

What is claimed is:

1. A method of making a pressure bulkhead assembly, the method comprising steps of:
   generating a plurality of splice-angle scans representing a plurality of splice surfaces of a plurality of splice angles;
   aligning the plurality of splice-angle scans to a nominal model representing the pressure bulkhead assembly to arrange the plurality of splice-angle scans at an initial position in which a plurality of splice-surface scans of the plurality of splice-angle scans represents a circumferential splice surface with an initial shape;
   determining an optimized position of the plurality of splice angles such that the plurality of splice surfaces of the plurality of splice angles will form the circumferential splice surface of the pressure bulkhead assembly with an optimized shape in which a step dimension between a mating edge of each one of the plurality of splice angles and the mating edge of a directly adjacent one of the plurality of splice angles is minimized;
   performing a virtual fit between the plurality of splice angles, at the optimized position, and an aft pressure bulkhead;
   determining splice-angle-hole positions of splice-angle holes to be drilled in each one of the plurality of splice angles such that the splice-angle holes will correspond to aft-pressure-bulkhead holes, pre-drilled in the aft pressure bulkhead;
   drilling the splice-angle holes in each one of the plurality of splice angles at the splice-angle-hole positions; and
   joining each one of the plurality of splice angles with the aft pressure bulkhead such that the plurality of splice surfaces forms the circumferential splice surface with the optimized shape.

2. The method of claim 1, wherein the step of aligning the plurality of splice-angle scans to the nominal model comprises performing a best fit between the plurality of splice-angle scans and the nominal model.

3. The method of claim 2, further comprising limiting degrees of freedom of each one of the plurality of splice-angle scans relative to the nominal model within a predetermined tolerance while performing the best fit.

4. The method of claim 1, further comprising steps of:
   determining a step dimension between a mating-edge scan of each one of the plurality of splice-angle scans and the mating-edge scan of a directly adjacent one of the plurality of splice-angle scans;
   determining an angular displacement of each one of the splice-angle scans to minimize the step dimension; and
   adjusting each one of the plurality of splice-angle scans by the angular displacement to move the plurality of splice-angle scans to an optimized position.

5. The method of claim 4, further comprising sequentially repeating the step of determining the step dimension, the step of determining the angular displacement for each one of the plurality of splice-angle scans, and the step of adjusting each one of the plurality of splice-angle scans by the angular displacement in an iterative matter until the step dimension is below a predetermined threshold.

6. The method of claim 4, further comprising virtually arranging the plurality of splice-angle scans in the optimized position before performing the virtual fit.

7. The method of claim 4, further comprising steps of:
   generating an aft-pressure-bulkhead scan representing the aft pressure bulkhead; and
   aligning the aft-pressure-bulkhead scan to the nominal model to virtually overlay the aft-pressure-bulkhead scan to the plurality of splice-angle scans, at the optimized position.

8. The method of claim 7, wherein the step of aligning the aft-pressure-bulkhead scan to the nominal model comprises performing a best fit between the aft-pressure-bulkhead scan and the nominal model.

9. The method of claim 7, further comprising steps of:
   determining shim dimensions of a shim to be positioned between a bulkhead interface surface of the aft pressure bulkhead and a flange surface of one of the plurality of splice angles;
   fabricating the shim based on the shim dimensions; and
   positioning the shim between the bulkhead interface surface and the flange surface before joining the one of the plurality of splice angles with the aft pressure bulkhead.

10. The method of claim 9, further comprising moving the aft-pressure-bulkhead scan relative to the plurality of splice-angle scans such that the shim dimensions of the shim are greater than minimum manufacturing dimensions.

11. The method of claim 1, further comprising fabricating the aft pressure bulkhead.

12. The method of claim 11, further comprising generating an aft-pressure-bulkhead scan representing the aft pressure bulkhead.

13. The method of claim 12, wherein the splice-angle-hole positions of the splice-angle holes are determined based on a virtual fit between the plurality of splice angles, at the optimized position, and the aft pressure bulkhead.

14. The method of claim 1, further comprising fabricating the plurality of splice angles.

15. The method of claim 12, further comprising measuring the plurality of splice surfaces of the plurality of splice angles.

16. The method of claim 13, further comprising drilling the aft-pressure-bulkhead holes in the aft pressure bulkhead.

17. The method of claim 16, further comprising determining aft-pressure-bulkhead-hole positions of the aft-pressure-bulkhead holes.

18. The method of claim 17, wherein the splice-angle-hole positions of the splice-angle holes are further determined based on the aft-pressure-bulkhead-hole positions of the aft-pressure-bulkhead holes.

19. A method of making a pressure bulkhead assembly, the method comprising steps of:
generating an aft-pressure-bulkhead scan representing an aft pressure bulkhead;
generating a plurality of splice-angle scans representing a plurality of splice surfaces of a plurality of splice angles;
aligning the plurality of splice-angle scans to a nominal model representing the pressure bulkhead assembly to arrange the plurality of splice-angle scans at an initial position in which a plurality of splice-surface scans of the plurality of splice-angle scans represents a circumferential splice surface with an initial shape;
determining an optimized position of the plurality of splice angles such that the plurality of splice surfaces of the plurality of splice angles will form the circumferential splice surface of the pressure bulkhead assembly with an optimized shape in which a step dimension between a mating edge of each one of the plurality of splice angles and the mating edge of a directly adjacent one of the plurality of splice angles is minimized;
performing a virtual fit between the plurality of splice angles, at the optimized position, and the aft pressure bulkhead;
determining splice-angle-hole positions of splice-angle holes to be drilled in each one of the plurality of splice angles such that the splice-angle holes will correspond to aft-pressure-bulkhead holes, pre-drilled in the aft pressure bulkhead;
drilling the splice-angle holes in each one of the plurality of splice angles at the splice-angle-hole positions; and
joining each one of the plurality of splice angles with the aft pressure bulkhead such that the plurality of splice surfaces forms the circumferential splice surface with the optimized shape.

20. The method of claim 19, wherein the splice-angle-hole positions of the splice-angle holes are determined based on the virtual fit between the plurality of splice angles, at the optimized position, and the aft pressure bulkhead.

* * * * *